US012606175B2

(12) United States Patent
Khiabani

(10) Patent No.: US 12,606,175 B2
(45) Date of Patent: Apr. 21, 2026

(54) PRIVATE MODEL SYNCING BETWEEN VEHICLES BASED ON ISOMETRIC CONTEXT TRANSFORMATIONS

(71) Applicant: Mercedes-Benz Group AG, Stuttgart (DE)

(72) Inventor: Yahya Sowti Khiabani, Fremont, CA (US)

(73) Assignee: MERCEDES-BENZ GROUP AG, Stuttgart (DE)

( * ) Notice: Subject to any disclaimer, the term of this patent is extended or adjusted under 35 U.S.C. 154(b) by 233 days.

(21) Appl. No.: 18/458,712

(22) Filed: Aug. 30, 2023

(65) Prior Publication Data

US 2025/0074430 A1     Mar. 6, 2025

(51) Int. Cl.
*B60W 40/08*          (2012.01)

(52) U.S. Cl.
CPC ..... *B60W 40/08* (2013.01); *B60W 2040/0809* (2013.01)

(58) Field of Classification Search
CPC ......... B60W 40/08; B60W 2040/0809; B60W 40/09
See application file for complete search history.

(56) References Cited

U.S. PATENT DOCUMENTS

| | | | |
|---|---|---|---|
| 3,792,423 A | 2/1974 | Becker et al. | |
| 4,095,223 A | 6/1978 | Howard | |
| 10,853,687 B2 | 12/2020 | Yan et al. | |
| 11,521,288 B2 * | 12/2022 | Bautista | G06Q 50/40 |
| 11,525,923 B2 | 12/2022 | Shin | |
| 12,165,436 B1 * | 12/2024 | Pertsel | G01S 13/931 |
| 2019/0266418 A1 * | 8/2019 | Xu | G06V 10/764 |
| 2019/0372754 A1 * | 12/2019 | Gou | H04L 9/0631 |
| 2021/0101616 A1 * | 4/2021 | Hayat | G06T 7/20 |
| 2023/0155812 A1 * | 5/2023 | Bennison | H04L 9/0861 713/171 |
| 2024/0227845 A1 * | 7/2024 | Esna Ashari Esfahani | G06V 20/582 |
| 2024/0393798 A1 * | 11/2024 | Ikeda | G05D 1/693 |

FOREIGN PATENT DOCUMENTS

| | | |
|---|---|---|
| CN | 115236690 B | 2/2023 |
| LU | 500509 B1 | 2/2022 |

* cited by examiner

*Primary Examiner* — Fadey S. Jabr
*Assistant Examiner* — Michael J Herrera
(74) *Attorney, Agent, or Firm* — Dority & Manning, P.A.

(57) ABSTRACT

Methods, computing systems, and technology for remotely training a machine-learned model using masked inputs is presented. For example, a computing system may be configured to obtain vehicle operations data associated with a user and a vehicle. The computing system may be configured to transform the vehicle operations data based on one or more isometric transformations to obtain a masked input, the one or more isometric transformations associated with a feature masking key. The computing system may be configured to input the masked input to a machine-learned model to obtain a masked output, wherein the machine-learned model was trained using previous masked inputs. The computing system may be configured to determine, based on an action masking key, an action associated with the masked output. The computing system may be configured to control a component of the vehicle based on the action.

20 Claims, 13 Drawing Sheets

1100

100

| REMOTE COMPUTING PLATFORM 110 | THIRD-PARTY COMPUTING PLATFORM 125 |

NETWORK(S) 130

105

VEHICLE COMPUTING SYSTEM 200

USER DEVICE 115

120

200

HW BASE LAYER
210

HW BASE LAYER
205

230

220

225

HW BASE
LAYER
205

COMPUTING
HARDWARE
215

COMPUTING PLATFORM 110

| | |
|---|---|
| 405 — VEHICLE SOFTWARE SYS. | SOFTWARE UPDATES — 410 |
| 415 — REMOTE ASSIST. SYS. | ASSISTANCE DATA — 420 |
| 425 — SECURITY SYSTEM | SECURITY DATA — 430 |
| 435 — NAVIGATION SYSTEM | MAP DATA — 440 |
| 445 — ENTERTAINMENT SYSTEM | ENTERTAINMENT DATA — 450 |
| 455 — USER SYSTEM | USER PROFILE DATA — 460 |

USER DEVICE 120 — 500

DISPLAY DEVICE

USER INTERFACE — 505

APPLICATION — 510

600

601

700

800

801

| n TRANSFORMED DATA POINTS WITH ENCRYPTED ACTION IDS |
| MASKING SIGNATURE |

703A

802

CLOUD

803

TRAINING WITH n TRANSFORMED DATA POINTS

VEHICLE

105

TRAINED MODEL

804

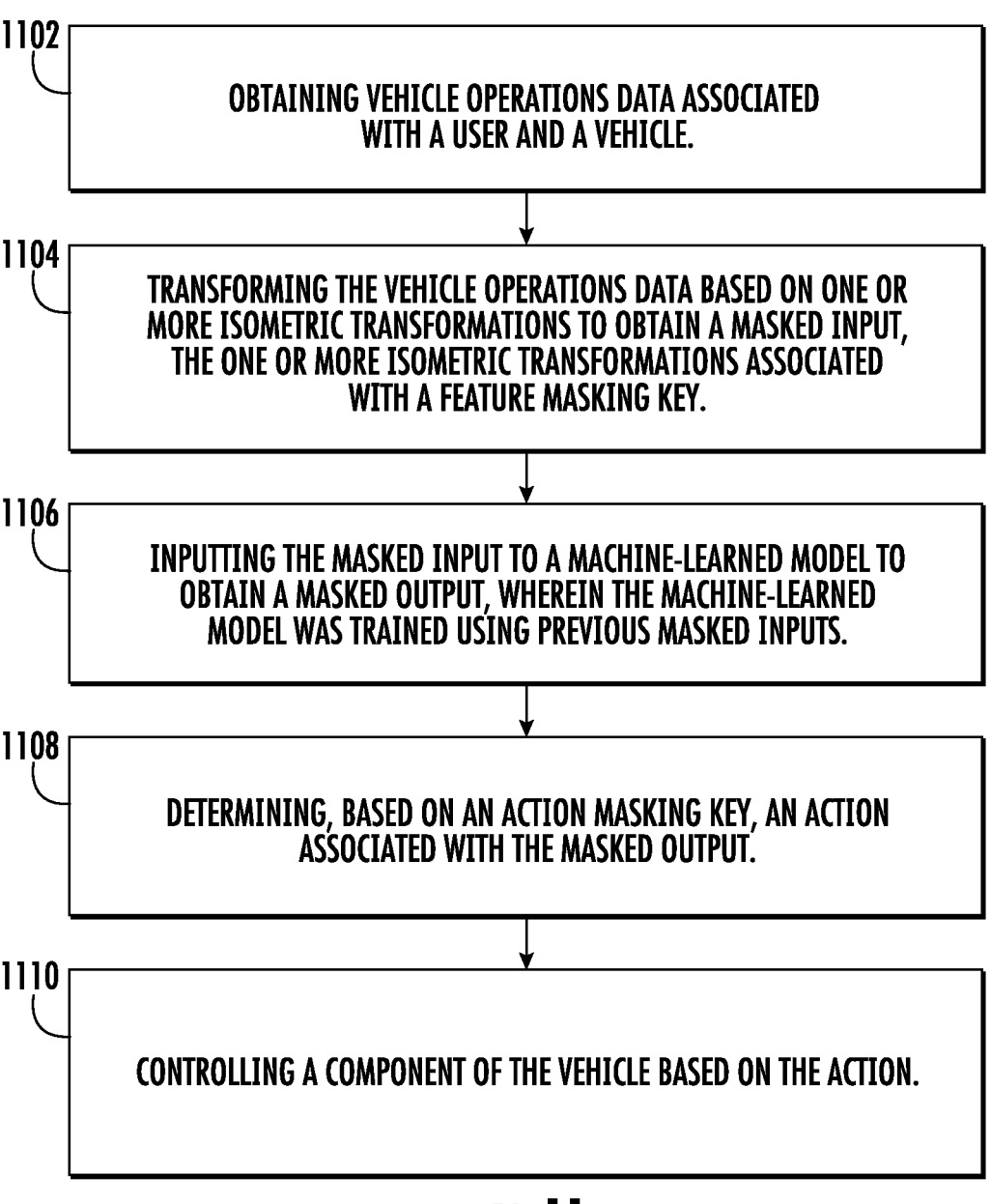

1100

1102
OBTAINING VEHICLE OPERATIONS DATA ASSOCIATED
WITH A USER AND A VEHICLE.

1104
TRANSFORMING THE VEHICLE OPERATIONS DATA BASED ON ONE OR
MORE ISOMETRIC TRANSFORMATIONS TO OBTAIN A MASKED INPUT,
THE ONE OR MORE ISOMETRIC TRANSFORMATIONS ASSOCIATED
WITH A FEATURE MASKING KEY.

1106
INPUTTING THE MASKED INPUT TO A MACHINE-LEARNED MODEL TO
OBTAIN A MASKED OUTPUT, WHEREIN THE MACHINE-LEARNED
MODEL WAS TRAINED USING PREVIOUS MASKED INPUTS.

1108
DETERMINING, BASED ON AN ACTION MASKING KEY, AN ACTION
ASSOCIATED WITH THE MASKED OUTPUT.

1110
CONTROLLING A COMPONENT OF THE VEHICLE BASED ON THE ACTION.

FIG. 11

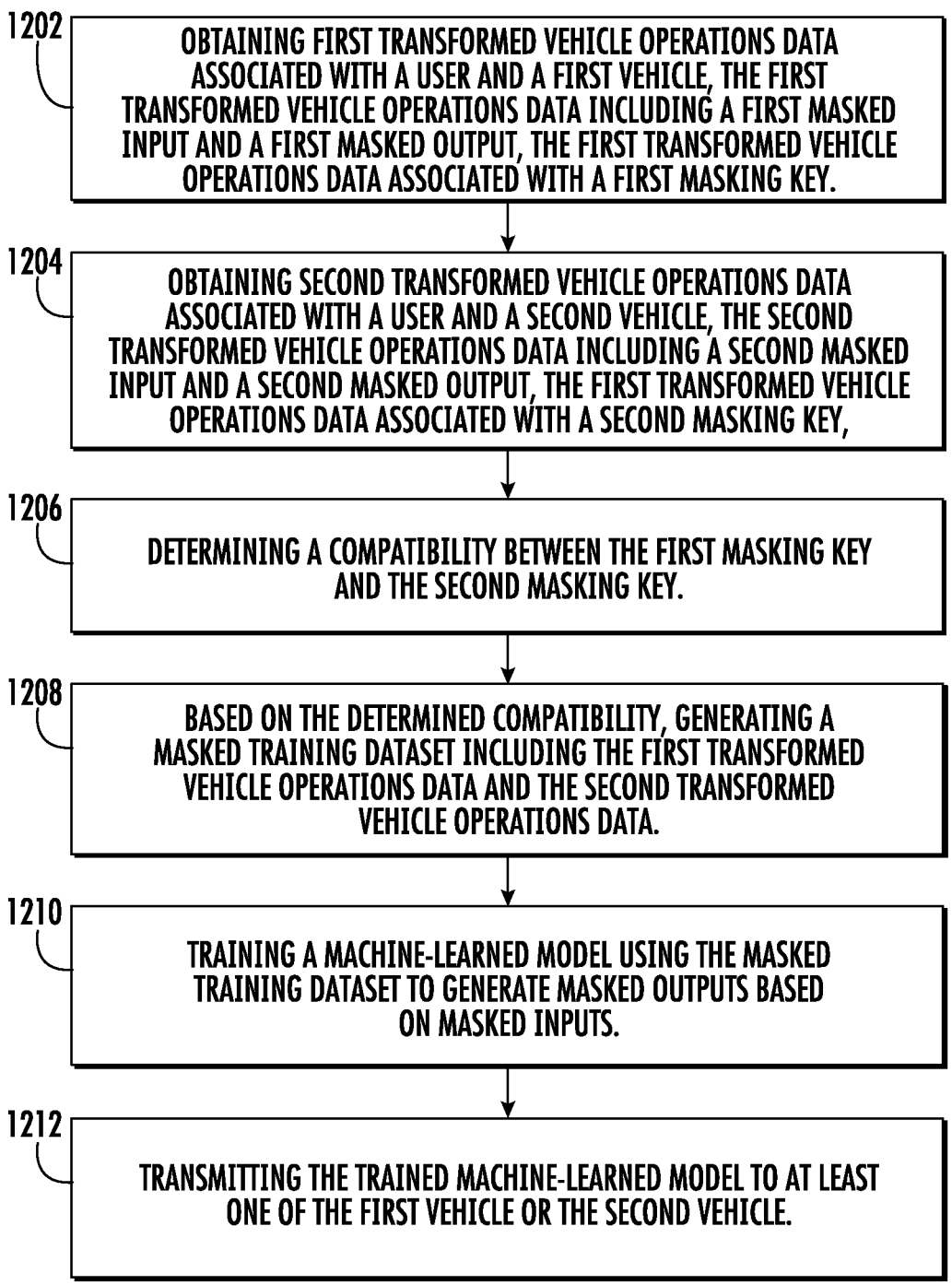

<u>1200</u>

1202 OBTAINING FIRST TRANSFORMED VEHICLE OPERATIONS DATA ASSOCIATED WITH A USER AND A FIRST VEHICLE, THE FIRST TRANSFORMED VEHICLE OPERATIONS DATA INCLUDING A FIRST MASKED INPUT AND A FIRST MASKED OUTPUT, THE FIRST TRANSFORMED VEHICLE OPERATIONS DATA ASSOCIATED WITH A FIRST MASKING KEY.

1204 OBTAINING SECOND TRANSFORMED VEHICLE OPERATIONS DATA ASSOCIATED WITH A USER AND A SECOND VEHICLE, THE SECOND TRANSFORMED VEHICLE OPERATIONS DATA INCLUDING A SECOND MASKED INPUT AND A SECOND MASKED OUTPUT, THE FIRST TRANSFORMED VEHICLE OPERATIONS DATA ASSOCIATED WITH A SECOND MASKING KEY,

1206 DETERMINING A COMPATIBILITY BETWEEN THE FIRST MASKING KEY AND THE SECOND MASKING KEY.

1208 BASED ON THE DETERMINED COMPATIBILITY, GENERATING A MASKED TRAINING DATASET INCLUDING THE FIRST TRANSFORMED VEHICLE OPERATIONS DATA AND THE SECOND TRANSFORMED VEHICLE OPERATIONS DATA.

1210 TRAINING A MACHINE-LEARNED MODEL USING THE MASKED TRAINING DATASET TO GENERATE MASKED OUTPUTS BASED ON MASKED INPUTS.

1212 TRANSMITTING THE TRAINED MACHINE-LEARNED MODEL TO AT LEAST ONE OF THE FIRST VEHICLE OR THE SECOND VEHICLE.

FIG. 12

PRIVATE MODEL SYNCING BETWEEN VEHICLES BASED ON ISOMETRIC CONTEXT TRANSFORMATIONS

FIELD

The present disclosure relates generally to remotely training machine-learned models. More particularly, the present disclosure relates to transforming vehicle data to remotely train a machine-learned model while preserving privacy of the vehicle data. The present disclosure also related to syncing one or more machine-learned models by remotely training a machine-learned model on a combined transformed dataset from the one or more machine-learned models.

BACKGROUND

A vehicle may include a machine-learned model trained to provide personalized recommendations to a user. The machine-learned model may rely on data that indicates behavioral or personal traits of the user.

SUMMARY

Aspects and advantages of implementations of the present disclosure will be set forth in part in the following description, or may be learned from the description, or may be learned through practice of the implementations.

One example aspect of the present disclosure is directed to a computing system of a vehicle. The computing system includes a control circuit configured to obtain vehicle operations data associated with a user and a vehicle. The control circuit is configured to transform the vehicle operations data based on one or more isometric transformations to obtain a masked input, the one or more isometric transformations associated with a feature masking key. The control circuit is configured to input the masked input to a machine-learned model to obtain a masked output, wherein the machine-learned model was trained using previous masked inputs. The control circuit is configured to determine, based on an action masking key, an action associated with the masked output. The control circuit is configured to control a component of the vehicle based on the action.

In an embodiment, vehicle operations data includes a plurality of data points, the plurality of data points associated with a spatial relationship.

In an embodiment, the control circuit is configured to extract a plurality of features, the plurality of features indicative of contextual information associated with the plurality of data points.

In an embodiment, the contextual information is indicative of at least one of: (i) a time, (ii) a location, or (iii) a day of week.

In an embodiment, the control circuit is configured to generate the one or more isometric transformations and the feature masking key associated with the one or more isometric transformations.

In an embodiment, the operation generating the one or more isometric transformation includes determining one or more transformation parameters using a random number generator, wherein the one or more transformation parameters include at least one of: (i) a translation parameter, (ii) a rotation parameter, or (iii) a reflection parameter.

In an embodiment, the machine-learned model was trained by a remote computing system based on a training dataset including the previous masked inputs associated with the vehicle and previous masked ground truth outputs associated with the user.

In an embodiment the control circuit is configured to generate a masking signature associated with the masking key and the action key. In an embodiment the control circuit is configured to transmit the masking signature, masked input, and a masked ground truth output to a remote computing system.

In an embodiment, the machine-learned model was trained by a remote computing system based on a training dataset comprising previous masked inputs associated with a second vehicle and previous masked ground truth outputs associated with the user.

In an embodiment, the control circuit is configured to train the machine-learned model based on the masked output and a masked ground truth action.

In an embodiment, the action is indicative of at least one of: (i) a predicted action of the user or (ii) a predicted action of the vehicle.

In an embodiment, the control circuit is configured to obtain a masking signature associated with the user. In an embodiment, the control circuit is configured to compare the masking signature with a cached masking signature. In an embodiment, the control circuit is configured to validate the feature masking key and the action masking key.

In an embodiment, the control circuit is configured to obtain a masking signature associated with the user. In an embodiment, the control circuit is configured to determine an incompatibility of the masking signature with a cached masking signature associated with a second user. In an embodiment, the control circuit is configured to generate an updated masking signature associated with an updated masking key and an updated action key. In an embodiment, the control circuit is configured to transmit updated masked input and updated masked ground truth output to the remote computing system. In an embodiment, the control circuit is configured to determine a compatibility of the updated masking signature with the cache masking signature associated with the second user.

One example aspect of the present disclosure is directed to a computer-implemented method. The computer-implemented method includes obtaining vehicle operations data associated with a user and a vehicle. The computer-implemented method includes transforming the vehicle operations data based on one or more isometric transformations to obtain a masked input, the one or more isometric transformations associated with a feature masking key. The computer-implemented method includes inputting the masked input to a machine-learned model to obtain a masked output, wherein the machine-learned model was trained using previous masked inputs. The computer-implemented method includes determining, based on an action masking key, an action associated with the masked output. The computer-implemented method includes controlling a component of the vehicle based on the action.

In an embodiment, the vehicle operations data includes a plurality of data points, the plurality of data points associated with a spatial relationship.

In an embodiment, the method includes extracting a plurality of features, the plurality of features indicative of contextual information associated with the plurality of data points.

In an embodiment, the contextual information is indicative of at least one of (i) a time, (ii) a location, or (iii) a day of week.

In an embodiment, the method includes generating the one or more isometric transformations and the feature masking key associated with the one or more isometric transformations.

In an embodiment, generating the one or more isometric transformation includes determining one or more transformation parameters using a random number generator, wherein the one or more transformation parameters includes at least one of: (i) a translation parameter, (ii) a rotation parameter, or (iii) a reflection parameter.

One example aspect of the present disclosure is directed to a computing system of a vehicle. The computing system includes a control circuit configured to obtain first transformed vehicle operations data associated with a user and a first vehicle, the first transformed vehicle operations data including a first masked input and a first masked output, the first transformed vehicle operations data associated with a first masking key. The control circuit is configured to obtain second transformed vehicle operations data associated with a user and a second vehicle, the second transformed vehicle operations data including a second masked input and a second masked output, the first transformed vehicle operations data associated with a second masking key. The control circuit is configured to determine a compatibility between the first masking key and the second masking key. The control circuit is configured to based on the determined compatibility, generate a masked training dataset including the first transformed vehicle operations data and the second transformed vehicle operations data. The control circuit is configured to train a machine-learned model using the masked training dataset to generate masked outputs based on masked inputs. The control circuit is configured to transmit the trained machine-learned model to at least one of the first vehicle or the second vehicle.

One example aspect of the present disclosure is directed to one or more non-transitory computer-readable media that store instructions that are executable by a control circuit to: obtain vehicle operations data associated with a user and a vehicle; transform the vehicle operations data based on one or more isometric transformations to obtain a masked input, the one or more isometric transformations associated with a feature masking key; input the masked input to a machine-learned model to obtain a masked output, wherein the machine-learned model was trained using previous masked inputs; determine, based on an action masking key, an action associated with the masked output; and control a component of the vehicle based on the action.

Other example aspects of the present disclosure are directed to other systems, methods, vehicles, apparatuses, tangible non-transitory computer-readable media, and devices for the technology described herein.

These and other features, aspects, and advantages of various implementations will become better understood with reference to the following description and appended claims. The accompanying drawings, which are incorporated in and constitute a part of this specification, illustrate implementations of the present disclosure and, together with the description, serve to explain the related principles.

BRIEF DESCRIPTION OF THE DRAWINGS

Detailed discussion of implementations directed to one of ordinary skill in the art are set forth in the specification, which makes reference to the appended figures, in which:

FIG. 11 illustrates a flowchart diagram of an example method according to an embodiment hereof.

FIG. 12 illustrates a flowchart diagram of an example method according to an embodiment hereof.

DETAILED DESCRIPTION

Figure 1:
FIG. 1 illustrates an example computing ecosystem according to an embodiment hereof.

An aspect of the present disclosure relates to systems and methods for remotely training machine-learned models. For instance, a vehicle may include one or more machine-learned models trained on data generated by a vehicle operator or user of the vehicle. As one example, a user preference prediction model may be used by the vehicle to predict comfort settings within the vehicle (e.g., seat adjustments, cabin temperature, radio stations, etc.). For example, such models may output a predicted vehicle action that may be implemented by the vehicle. Due to privacy constraints, these models are unable to be remotely trained using additional datasets generated by the vehicle operator or user in other vehicles. For instance, the vehicle operator or user may operate a second vehicle (e.g., rental vehicle, second vehicle, etc.) and train a second machine-learned model separately. Aspects of the present disclosure enable these models to be trained remotely using an isometric transformation and masking mechanism to generate a combined dataset to train a machine-learned model while preserving privacy of the data. In an embodiment, these models may be remotely trained and synced such that both vehicles maintain the most currently trained model.

In particular, machine-learned models that are distance dependent such as, for example, clustering models, may train on data points generated by a vehicle operator or user (e.g., vehicle data) in Euclidean space (e.g., multi-dimensional spaces). For instance, a data point generated based on the user tuning a radio station at 7:30 AM in their driveway may be separated by a time and location dimension from a datapoint generated where the user takes the same action at 5:30 PM at their workplace. The raw sensitive information such as the home and workplace of the user indicated by the data points may not be suitable for transmission to a remote training system. Both traditional homomorphic encryption (HE) and differential privacy techniques (DP) face challenges in effectively safeguarding the privacy of data points while preserving the distance between them. The complex computations involved in calculating distance metrics in HE make it difficult to approximate, and DP techniques, with the addition of noise to the data, can compromise the accuracy of the preserved distances. As a result, these approaches become impractical for ensuring both privacy and distance preservation simultaneously.

To address this problem, the technology of the present disclosure allows the vehicle to transform vehicle data using an isometric transformation and masking technique. For instance, a 2D isometric transformation for context may be applied to data points. The isometric transformation may include a rotation, reflection, and transformation formation to transform the data points while maintaining the original distance within a multi-dimensional space. By way of example, a data point may include context such as, time of day, day of week, location (e.g., latitude, longitude, etc.), or temperature (e.g., vehicle cabin temperature, outside temperature, etc.). The time of day may be converted to circular features (e.g., time x and time y) and may similarly be applied to the day of week. In an embodiment, the context such as the location (e.g., latitude and longitude) or temperature (e.g., inside and outside) may form a two-dimensional space without conversion. A random transformation may perform a rotation, reflection, and translation with random shift for each pair of features in their corresponding two-dimensional space across the context. In an embodiment, the final transformation may include a transformation key (e.g., masking key). For instance, the masking key may include the randomly generated rotation, reflection, and translation keys.

In an embodiment, a masking signature may be generated based on the masking key. For instance, the masking key including the randomly generated keys may be hashed to generate a masking signature. The masking signature may be used to match the masking keys (e.g., transformation keys) between the vehicle and a remote training system or the vehicle and a second vehicle. The transformed data points each may be associated with an action id that may be encrypted. For instance, the data point may be generated based on an action taken by the user or a predicted action taken by the vehicle. The action id may indicate the action associated with data point and may be encrypted. In an embodiment, decryption keys may be generated to decrypt the action id.

The transformed data points, encrypted action ids, and masking signature may be transmitted to a remote training computing system (e.g., cloud computing system) where a machine-learned model may be trained using the transformed data. Once trained, the cloud computing system may transmit the trained model to a vehicle. For instance, the in-vehicle model may be replaced by the trained model from the cloud computing system.

The vehicle may utilize the trained model to generate output (e.g., predicted actions) which maximizes the comfort or anticipate the preferences of the user. In an embodiment, the output may be masked output. For instance, the trained machine-learned model may train on masked (e.g., transformed encrypted data) and produce masked outputs associated with an encrypted action id. The vehicle may determine a predicted action for the vehicle based on the masking signature and decryption keys. For example, the vehicle may decrypt the action id and the vehicle may implement the predicted action.

The technology of the present disclosure also improves the onboard computing technology of the vehicle. For instance, the vehicle's onboard computing system may obtain a fully trained machine-learned model. The vehicle computing system may determine, based on a user identifier, that a machine-learned model has been trained or personalized to the user's preferences. This allows the vehicle computing system to receive a fully trained machine-learned model tailored for the user and more efficiently generate predicted actions thereof. Accordingly, the vehicle computing system may avoid wasting its own computing resources to train and configure each vehicle operated by the same user. For instance, a second vehicle operated by the user may sync the in-vehicle model with a first vehicle to receive the most recently trained model tailored to the user. In this way, the vehicle computing system can more efficiently utilize its computing resources to perform other tasks.

The technology of the present disclosure may include the collection of data associated with a user in the event that the user expressly authorizes such collection. Such authorization may be provided by the user via explicit user input to a user interface in response to a prompt that expressly requests such authorization. Collected data may be anonymized, pseudonymized, encrypted, noised, securely stored, or otherwise protected. A user may opt out of such data collection at any time.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

FIG. 1 illustrates an example computing ecosystem 100 according to an embodiment hereof. The ecosystem 100 may include a vehicle 105, a remote computing platform 110 (also referred to herein as computing platform 110), and a user device 115 associated with a user 120. The user 120 may be a driver of the vehicle 105. In some implementations, the user 120 may be a passenger of the vehicle 105. In some implementations, the computing ecosystem 100 may include a third party (3P) computing platform 125, as further described herein. The vehicle 105 may include a vehicle computing system 200 located onboard the vehicle 105. The computing platform 110, the user device 115, the third party computing platform 125, and/or the vehicle computing system 200 may be configured to communicate with one another via one or more networks 130.

The systems/devices of ecosystem 100 may communicate using one or more application programming interfaces (APIs). This may include external facing APIs to communicate data from one system/device to another. The external facing APIs may allow the systems/devices to establish secure communication channels via secure access channels over the networks 130 through any number of methods, such as web-based forms, programmatic access via RESTful APIs, Simple Object Access Protocol (SOAP), remote procedure call (RPC), scripting access, etc.

The computing platform 110 may include a computing system that is remote from the vehicle 105. In an embodiment, the computing platform 110 may include a cloud-based server system. The computing platform 110 may be associated with (e.g., operated by) an entity. For example, the remote computing platform 110 may be associated with an OEM that is responsible for the make and model of the vehicle 105. In another example, the remote computing platform 110 may be associated with a service entity contracted by the OEM to operate a cloud-based server system that provides computing services to the vehicle 105.

The computing platform 110 may include one or more back-end services for supporting the vehicle 105. The services may include, for example, tele-assist services, navigation/routing services, performance monitoring services, etc. In an embodiment, the remote computing platform 110 may train one or more machine-learned models utilized by the vehicle 105. The computing platform 110 may host or otherwise include one or more APIs for communicating data to/from a vehicle computing system 200 of the vehicle 105 or the user device 115. The computing platform 110 may include one or more inter-service APIs for communication among its microservices. In some implementations, the computing platform may include one or more RPCs for communication with the user device 115.

The computing platform 110 may include one or more computing devices. For instance, the computing platform 110 may include a control circuit and a non-transitory computer-readable medium (e.g., memory). The control circuit of the computing platform 110 may be configured to perform the various operations and functions described herein. A further description of the computing hardware and components of computing platform 110 is provided herein with reference to other figures.

The user device 115 may include a computing device owned or otherwise accessible to the user 120. For instance, the user device 115 may include a phone, laptop, tablet, wearable device (e.g., smart watch, smart glasses, headphones), personal digital assistant, gaming system, personal desktop devices, other hand-held devices, or other types of mobile or non-mobile user devices. As further described herein, the user device 115 may include one or more input components such as buttons, a touch screen, a joystick or other cursor control, a stylus, a microphone, a camera or other imaging device, a motion sensor, etc. The user device 115 may include one or more output components such as a display device (e.g., display screen), a speaker, etc.

In an embodiment, the user device 115 may include a component such as, for example, a touchscreen, configured to perform input and output functionality to receive user input and present information for the user 120. The user device 115 may execute one or more instructions to run an instance of a software application and present user interfaces associated therewith, as further described herein. In an embodiment, the launch of a software application may initiate a user-network session with the computing platform 110.

The third-party computing platform 125 may include a computing system that is remote from the vehicle 105, remote computing platform 110, and user device 115. In an embodiment, the third-party computing platform 125 may include a cloud-based server system. The term "third-party entity" may be used to refer to an entity that is different than the entity associated with the remote computing platform 110. For example, as described herein, the remote computing platform 110 may be associated with an OEM that is responsible for the make and model of the vehicle 105. The third-party computing platform 125 may be associated with a supplier of the OEM, a maintenance provider, a mapping service provider, an emergency provider, or other types of entities. In another example, the third-party computing platform 125 may be associated with an entity that owns, operates, manages, etc. a software application that is available to or downloaded on the vehicle computing system 200.

The third-party computing platform 125 may include one or more back-end services provided by a third-party entity. The third-party computing platform 125 may provide services that are accessible by the other systems and devices of the ecosystem 100. The services may include, for example, mapping services, routing services, search engine functionality, maintenance services, entertainment services (e.g., music, video, images, gaming, graphics), emergency services (e.g., roadside assistance, 911 support), or other types of services. In an embodiment, the third-party computing platform 125 may train one or more machine-learned models utilized by the vehicle 105. The third-party computing platform 125 may host or otherwise include one or more APIs for communicating data to/from the third-party computing system 125 to other systems/devices of the ecosystem 100.

The networks 130 may be any type of network or combination of networks that allows for communication between devices. In some implementations, the networks 130 may include one or more of a local area network, wide area network, the Internet, secure network, cellular network, mesh network, peer-to-peer communication link or some combination thereof and may include any number of wired or wireless links. Communication over the networks 130 may be accomplished, for instance, via a network interface using any type of protocol, protection scheme, encoding, format, packaging, etc. In an embodiment, communication between the vehicle computing system 200 and the user device 115 may be facilitated by near field or short range communication techniques (e.g., Bluetooth low energy protocol, radio frequency signaling, NFC protocol).

The vehicle 105 may be a vehicle that is operable by the user 120. In an embodiment, the vehicle 105 may be an automobile or another type of ground-based vehicle that is manually driven by the user 120. For example, the vehicle 105 may be a Mercedes-Benz® car or van. In some implementations, the vehicle 105 may be an aerial vehicle (e.g., a personal airplane) or a water-based vehicle (e.g., a boat). The vehicle 105 may include operator-assistance functionality such as cruise control, advanced driver assistance systems, etc. In some implementations, the vehicle 105 may be a fully or semi-autonomous vehicle.

The vehicle 105 may include a power train and one or more power sources. The powertrain may include a motor (e.g., an internal combustion engine, electric motor, or hybrid thereof), e-motor (e.g., electric motor), transmission (e.g., automatic, manual, continuously variable), driveshaft, axles, differential, e-components, gear, etc. The power sources may include one or more types of power sources. For example, the vehicle 105 may be a fully electric vehicle (EV) that is capable of operating a power train of the vehicle 105 (e.g., for propulsion) and the vehicle's onboard functions using electric batteries. In an embodiment, the vehicle 105 may use combustible fuel. In an embodiment, the vehicle 105 may include hybrid power sources such as, for example, a combination of combustible fuel and electricity.

The vehicle 105 may include a vehicle interior. The vehicle interior may include the area inside of the body of the vehicle 105 including, for example, a cabin for users of the vehicle 105. The interior of the vehicle 105 may include seats for the users, a steering mechanism, accelerator interface, braking interface, etc. The interior of the vehicle 105 may include a display device such as a display screen associated with an infotainment system, as further described with respect to FIG. 3.

The vehicle 105 may include a vehicle exterior. The vehicle exterior may include the outer surface of the vehicle

105. The vehicle exterior may include one or more lighting elements (e.g., headlights, brake lights, accent lights). The vehicle 105 may include one or more doors for accessing the vehicle interior by, for example, manipulating a door handle of the vehicle exterior. The vehicle 105 may include one or more windows, including a windshield, door windows, passenger windows, rear windows, sunroof, etc.

The systems and components of the vehicle 105 may be configured to communicate via a communication channel. The communication channel may include one or more data buses (e.g., controller area network (CAN)), on-board diagnostics connector (e.g., OBD-II), or a combination of wired or wireless communication links. The onboard systems may send or receive data, messages, signals, etc. amongst one another via the communication channel.

In an embodiment, the communication channel may include a direct connection, such as a connection provided via a dedicated wired communication interface, such as a RS-232 interface, a universal serial bus (USB) interface, or via a local computer bus, such as a peripheral component interconnect (PCI) bus. In an embodiment, the communication channel may be provided via a network. The network may be any type or form of network, such as a personal area network (PAN), a local-area network (LAN), Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the systems/devices of the vehicle 105 may communicate via an intermediate storage device, or more generally an intermediate non-transitory computer-readable medium. For example, the non-transitory computer-readable medium 140, which may be external to the vehicle computing system 200, may act as an external buffer or repository for storing information. In such an example, the vehicle computing system 200 may retrieve or otherwise receive the information from the non-transitory computer-readable medium 140.

Certain routine and conventional components of vehicle 105 (e.g., an engine) are not illustrated and/or discussed herein for the purpose of brevity. One of ordinary skill in the art will understand the operation of conventional vehicle components in vehicle 105.

The vehicle 105 may include a vehicle computing system 200. As described herein, the vehicle computing system 200 is onboard the vehicle 105. For example, the computing devices and components of the vehicle computing system 200 may be housed, located, or otherwise included on or within the vehicle 105. The vehicle computing system 200 may be configured to execute the computing functions and operations of the vehicle 105.

Figure 2A:
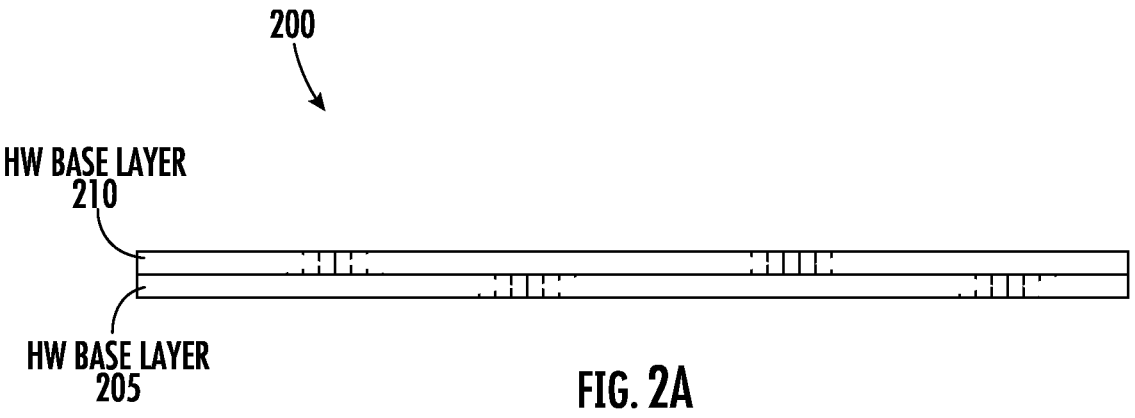
FIGS. 2A-D illustrate diagrams of an example computing architecture for an onboard computing system of a vehicle according to an embodiment hereof.

FIG. 2A illustrates an overview of an operating system of the vehicle computing system 200. The operating system may be a layered operating system. The vehicle computing system 200 may include a hardware layer 205 and a software layer 210. The hardware and software layers 205, 210 may include sub-layers. In some implementations, the operating system of the vehicle computing system 200 may include other layers (e.g., above, below, or in between those shown in FIG. 2A). In an example, the hardware layer 205 and the software layer 210 can be standardized base layers of the vehicle's operating system.

Figure 2B:
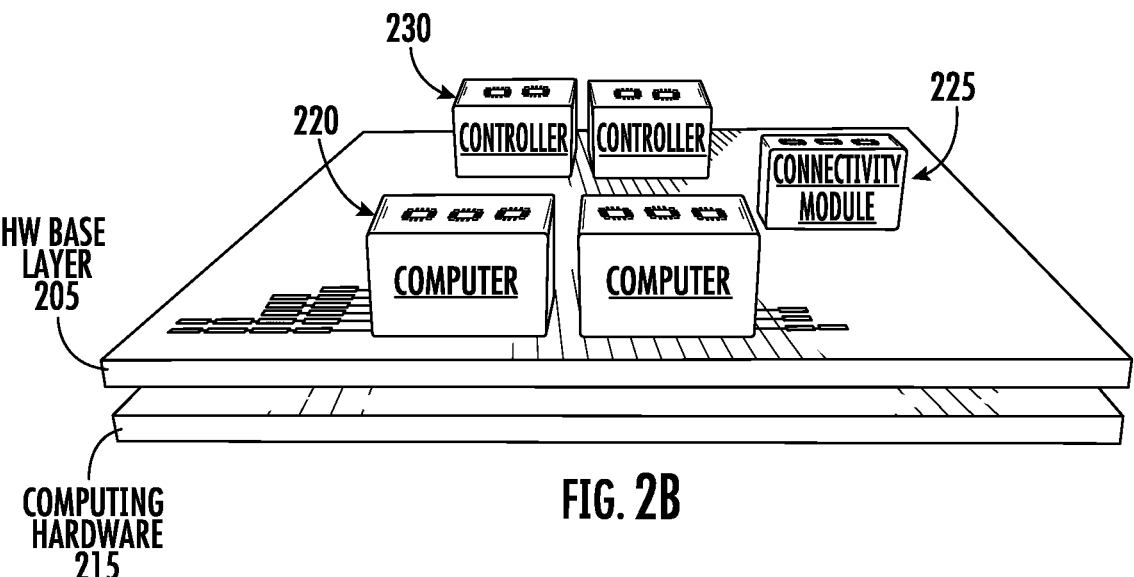

FIG. 2B illustrates a diagram of the hardware layer 205 of the vehicle computing system 200. In the layered operating system of the vehicle computing system 200, the hardware layer 205 can reside between the physical computing hardware 215 onboard the vehicle 105 and the software (e.g., of software layer 210) that runs onboard the vehicle 105.

The hardware layer 205 may be an abstraction layer including computing code that allows for communication between the software and the computing hardware 215 in the vehicle computing system 200. For example, the hardware layer 205 may include interfaces and calls that allow the vehicle computing system 200 to generate a hardware-dependent instruction to the computing hardware 215 (e.g., processors, memories, etc.) of the vehicle 105.

The hardware layer 205 may be configured to help coordinate the hardware resources. The architecture of the hardware layer 205 may be serviced oriented. The services may help provide the computing capabilities of the vehicle computing system 105. For instance, the hardware layer 205 may include the domain computers 220 of the vehicle 105, which may host various functionality of the vehicle 105 such as the vehicle's intelligent functionality (e.g., machine-learned models, etc.). The specification of each domain computer may be tailored to the functions and the performance requirements where the services are abstracted to the domain computers. By way of example, this permits certain processing resources (e.g., graphical processing units) to support the functionality of a central in-vehicle infotainment computer for rendering graphics across one or more display devices for navigation, games, etc. or to support an intelligent automated driving computer to achieve certain industry assurances.

The hardware layer 205 may be configured to include a connectivity module 225 for the vehicle computing system 200. The connectivity module may include code/instructions for interfacing with the communications hardware of the vehicle 105. This can include, for example, interfacing with a communications controller, receiver, transceiver, transmitter, port, conductors, or other hardware for communicating data/information. The connectivity module 225 may allow the vehicle computing system 200 to communicate with other computing systems that are remote from the vehicle 105 including, for example, remote computing platform 110 (e.g., an OEM cloud platform).

The architecture design of the hardware layer 205 may be configured for interfacing with the computing hardware 215 for one or more vehicle control units 230. The vehicle control units 230 may be configured for controlling various functions of the vehicle 105. This may include, for example, a central exterior and interior controller (CEIC), a charging controller, or other controllers as further described herein. In an embodiment, the vehicle 105 may automatically implement vehicle controls via the vehicle control units 230. For instance, a machine-learned model may output vehicle actions to be implemented by the vehicle 105. The vehicle 105 may receive the output and utilize the vehicle control units 230 to implement the action. An example of a machine-learned model generating output indicative of a vehicle action is further described with reference to FIG. 10.

Figure 2C:
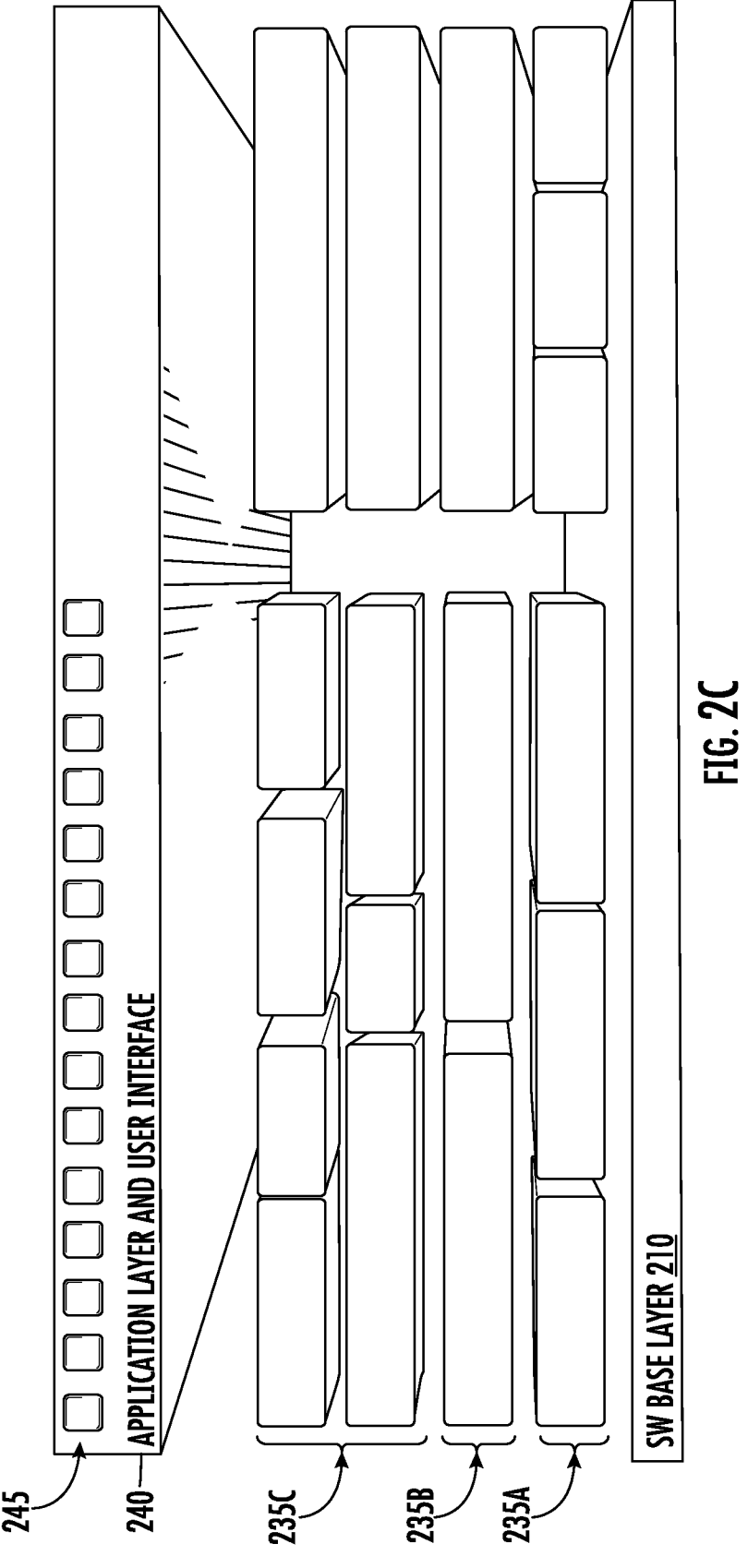

The software layer 205 may be configured to provide software operations for executing various types of functionality and applications of the vehicle 105. FIG. 2C illustrates a diagram of the software layer 210 of the vehicle computing system 200. The architecture of the software layer 210 may be service oriented and may be configured to provide software for various functions of the vehicle computing system 200. To do so, the software layer 210 may include a plurality of sublayers 235A-E. For instance, the software layer 210 may include a first sublayer 235A including firmware (e.g., audio firmware) and a hypervisor, a second sublayer 235B including operating system components (e.g., open-source components), and a third sublayer 235C including middleware (e.g., for flexible integration with applications developed by an associated entity or third-party entity).

The vehicle computing system 200 may include an application layer 240. The application layer 240 may allow for integration with one or more software applications 245 that are downloadable or otherwise accessible by the vehicle 105. The application layer 240 may be configured, for example, using containerized applications developed by a variety of different entities.

Figure 2D:
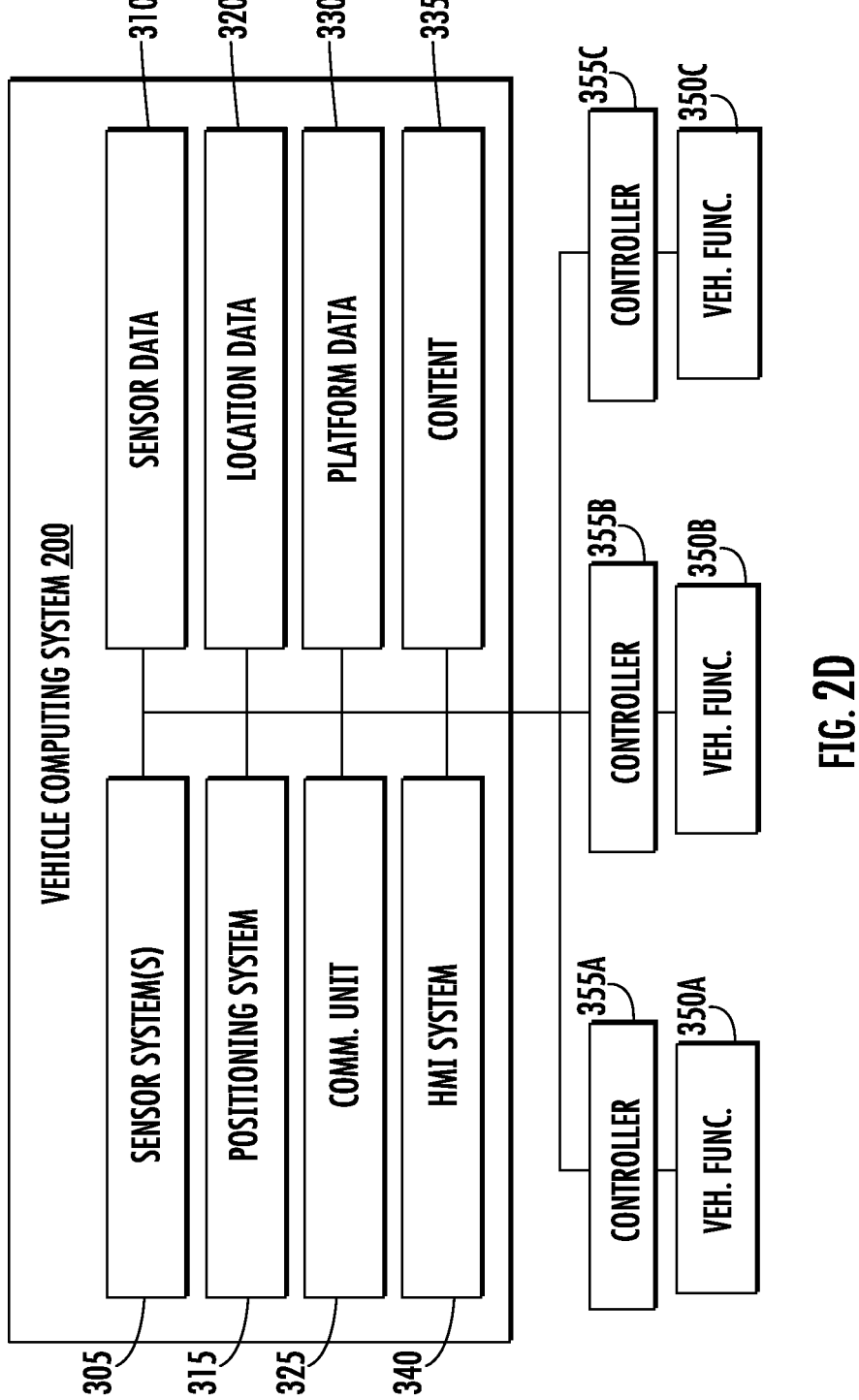

The layered operating system and the vehicle's onboard computing resources may allow the vehicle computing system 200 to collect and communicate data as well as operate the systems implemented onboard the vehicle 105. FIG. 2D illustrates a block diagram of example systems and data of the vehicle 105.

The vehicle 105 may include one or more sensor systems 305. A sensor system 305 may include or otherwise be in communication with a sensor of the vehicle 105 and a module for processing sensor data 310 associated with the sensor configured to acquire the sensor data 305. This may include sensor data 310 associated with the surrounding environment of the vehicle 105, sensor data associated with the interior of the vehicle 105, or sensor data associated with a particular vehicle function. The sensor data 310 may be indicative of conditions observed in the interior of the vehicle, exterior of the vehicle, or in the surrounding environment. For instance, the sensor data 305 may include image data, inside/outside temperature data, weather data, data indicative of a position of a user/object within the vehicle 105, weight data, motion/gesture data, audio data, or other types of data. The sensors may include one or more: cameras (e.g., visible spectrum cameras, infrared cameras), motion sensors, audio sensors (e.g., microphones), weight sensors (e.g., for a vehicle a seat), temperature sensors, humidity sensors, Light Detection and Ranging (LIDAR) systems, Radio Detection and Ranging (RADAR) systems, or other types of sensors.

The vehicle 105 may include a positioning system 315. The positioning system 315 may be configured to generate location data 320 (also referred to as position data) indicative of a location (also referred to as a position) of the vehicle 105. For example, the positioning system 315 may determine location by using one or more of inertial sensors (e.g., inertial measurement units, etc.), a satellite positioning system, based on IP address, by using triangulation and/or proximity to network access points or other network components (e.g., cellular towers, WiFi access points, etc.), or other suitable techniques. The positioning system 315 may determine a current location of the vehicle 105. The location may be expressed as a set of coordinates (e.g., latitude, longitude), an address, a semantic location (e.g., "at work"), etc.

In an embodiment, the positioning system 315 may be configured to localize the vehicle 105 within its environment. For example, the vehicle 105 may access map data that provides detailed information about the surrounding environment of the vehicle 105. The map data may provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, or instructions of signage (e.g., stop signs, yield signs), traffic lights (e.g., stop lights), parking restrictions, or other traffic signals or control devices/markings (e.g., cross walks)); or any other data. The positioning system 315 may localize the vehicle 105 within the environment (e.g., across multiple axes) based on the map data. For example, the positioning system 155 may process certain sensor data 310 (e.g., LIDAR data, camera data, etc.) to match it to a map of the surrounding environment to get an understanding of the vehicle's position within that environment. The determined position of the vehicle 105 may be used by various systems of the vehicle computing system 200 or another computing system (e.g., the remote computing platform 110, the third-party computing platform 125, the user device 115).

The vehicle 105 may include a communications unit 325 configured to allow the vehicle 105 (and its vehicle computing system 200) to communicate with other computing devices. The vehicle computing system 200 may use the communications unit 325 to communicate with the remote computing platform 110 or one or more other remote computing devices over a network 130 (e.g., via one or more wireless signal connections). For example, the vehicle computing system 200 may utilize the communications unit 325 to receive platform data 330 from the computing platform 110. This may include, for example, an over-the-air (OTA) software update for the operating system or machine-learned models (e.g., model syncing) of the vehicle computing system 200. Additionally, or alternatively, the vehicle computing system 200 may utilize the communications unit 325 to send vehicle data 335 to the computing platform 110. The vehicle data 335 may include any data acquired onboard the vehicle 105 including, for example, sensor data 310, location data 320, diagnostic data, user input data, data indicative of current software versions or currently running applications, occupancy data, data associated with the user 120 of the vehicle 105, or other types of data obtained (e.g., acquired, accessed, generated, downloaded, etc.) by the vehicle computing system 200.

In an embodiment, vehicle data 335 may include masked or encrypted data. For instance, data acquired onboard the vehicle 105 may include private or sensitive data. In some implementations, data may need to be masked, encrypted, anonymized, etc. to protect the privacy or sensitivity of the data. Example, sensitive data may include home locations, work locations, frequently visited locations, etc. An example of masking and encrypting vehicle data 335 is further described with reference to FIGS. 6-7.

In some implementations, the communications unit 325 may allow communication among one or more of the systems on-board the vehicle 105.

In an embodiment, the communications unit 325 may be configured to allow the vehicle 105 to communicate with or otherwise receive data from the user device 115 (shown in FIG. 1). The communications unit 325 may utilize various communication technologies such as, for example, Bluetooth low energy protocol, radio frequency signaling, or other short range or near filed communication technologies. The communications unit 325 may include any suitable components for interfacing with one or more networks, including, for example, transmitters, receivers, ports, controllers, antennas, or other suitable components that may help facilitate communication.

The vehicle 105 may include one or more human-machine interfaces (HMIs) 340. The human-machine interfaces 340 may include a display device, as described herein. The display device (e.g., touchscreen) may be viewable by a user of the vehicle 105 (e.g., user 120) that is located in the front of the vehicle 105 (e.g., driver's seat, front passenger seat).

Additionally, or alternatively, a display device (e.g., rear unit) may be viewable by a user that is located in the rear of the vehicle 105 (e.g., back passenger seats). The human-machine interfaces 340 may present content 335 via a user interface for display to a user 120.

Figure 3:
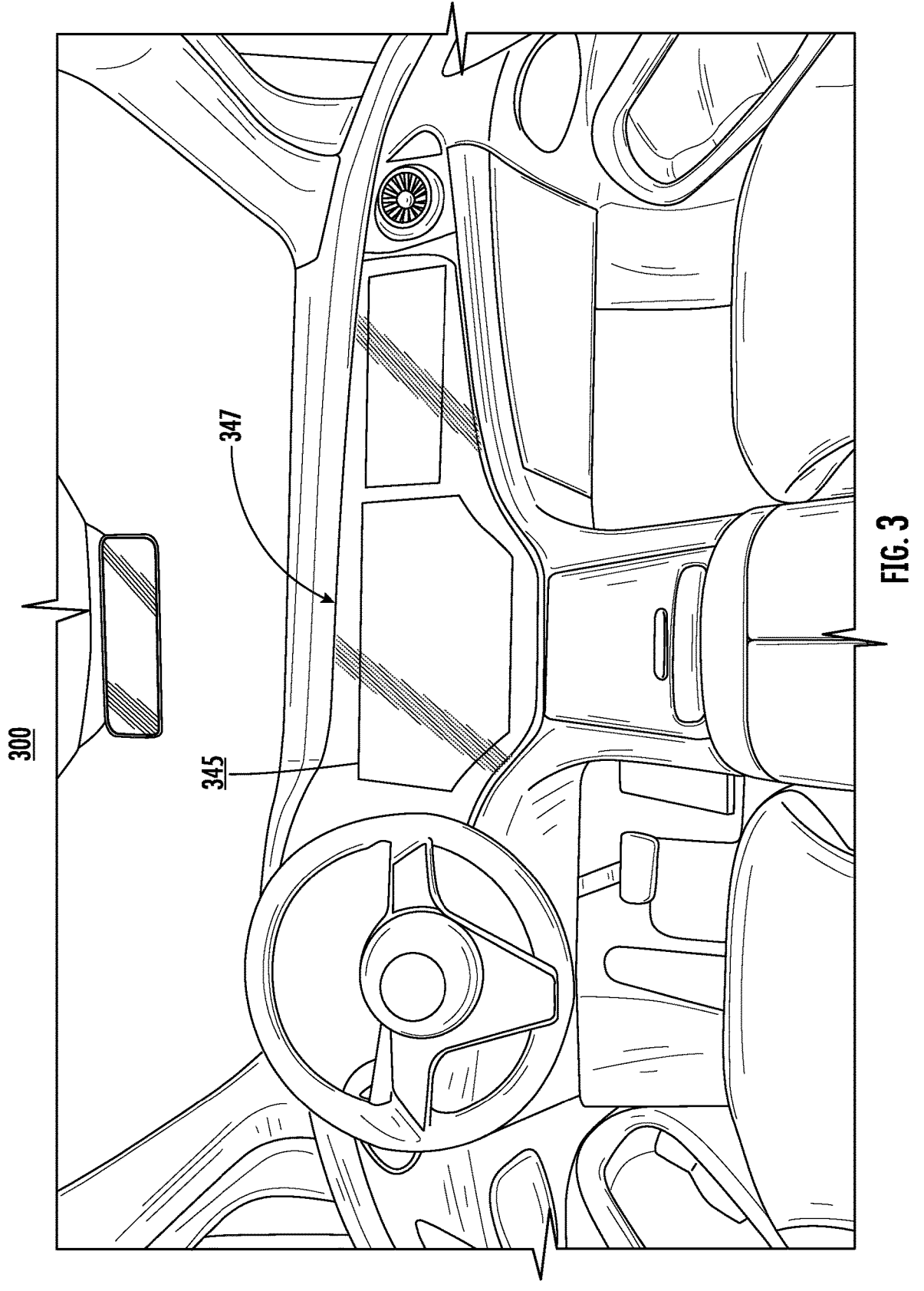
FIG. 3 illustrates an example vehicle interior with an example display according to an embodiment hereof.

FIG. 3 illustrates an example vehicle interior 300 with a display device 345. The display device 345 may be a component of the vehicle's infotainment system. Such a component may be referred to as a display device of the infotainment system or be considered as a device for implementing an embodiment that includes the use of an infotainment system. For illustrative and example purposes, such a component may be referred to herein as a head unit display device (e.g., positioned in a front/dashboard area of the vehicle interior), a rear unit display device (e.g., positioned in the back passenger area of the vehicle interior), an infotainment head unit or rear unit, or the like. The display device 345 may be located on, form a portion of, or function as a dashboard of the vehicle 105. The display device 345 may include a display screen, CRT, LCD, plasma screen, touch screen, TV, projector, tablet, and/or other suitable display components.

The display device 345 may display a variety of content to the user 120 including information about the vehicle 105, prompts for user input, etc. The display device 345 may include a touchscreen through which the user 120 may provide user input (e.g., user action) to a user interface.

For example, the display device 345 may include user interface rendered via a touch screen that presents various content. The content may include vehicle speed, mileage, fuel level, charge range, navigation/routing information, audio selections, streaming content (e.g., video/image content), internet search results, comfort settings (e.g., temperature, humidity, seat position, seat massage), or other vehicle data 335. The display device 345 may render content to facilitate the receipt of user input. For instance, the user interface of the display device 345 may present one or more soft buttons with which a user 120 can interact to adjust various vehicle functions (e.g., navigation, audio/streaming content selection, temperature, seat position, seat massage, etc.). In an embodiment, the display device 345 may present one or more predicted actions output by a machine-learned model. For instance, a machine-learned model may be trained to learn, anticipate, and predict adjustments to various vehicle functions. In an embodiment, a machine-learned model may output a predicted action and display a recommendation indicating the predicted action on the display device 345. Additionally, or alternatively, the display device 345 may be associated with an audio input device (e.g., microphone) for receiving audio input from the user 120.

Returning to FIG. 2D, the vehicle 105 may include a plurality of vehicle functions 350A-C. A vehicle function 350A-C may be a functionality that the vehicle 105 is configured to perform based on a detected input. The vehicle functions 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. The user 120 may interact with a vehicle function 250A-C through user input (e.g., to an adjustable input device, UI element) that specifies a setting of the vehicle function 250A-C selected by the user.

Each vehicle function may include a controller 355A-C associated with that particular vehicle function 355A-C. The controller 355A-C for a particular vehicle function may include control circuitry configured to operate its associated vehicle function 355A-C. For example, a controller may include circuitry configured to turn the seat heating function on, to turn the seat heating function off, set a particular temperature or temperature level, etc.

In an embodiment, a controller 355A-C for a particular vehicle function may include or otherwise be associated with a sensor that captures data indicative of the vehicle function being turned on or off, a setting of the vehicle function, etc. For example, a sensor may be an audio sensor or a motion sensor. The audio sensor may be a microphone configured to capture audio input from the user 120. For example, the user 120 may provide a voice command to activate the radio function of the vehicle 105 and request a particular station. The motion sensor may be a visual sensor (e.g., camera), infrared, RADAR, etc. configured to capture a gesture input from the user 120. For example, the user 120 may provide a hand gesture motion to adjust a temperature function of the vehicle 105 to lower the temperature of the vehicle interior.

The controllers 355A-C may be configured to send signals to another onboard system. The signals may encode data associated with a respective vehicle function. The encoded data may indicate, for example, a function setting, timing, etc. In an example, such data may be used to generate content for presentation via the display device 345 (e.g., showing a current setting). In another examples, such data may be used to generate AR content for presentation via the user device 115 (e.g., AR glasses). Additionally, or alternatively, such data can be included in vehicle data 335 and transmitted to the remote computing platform 110.

Figure 4:
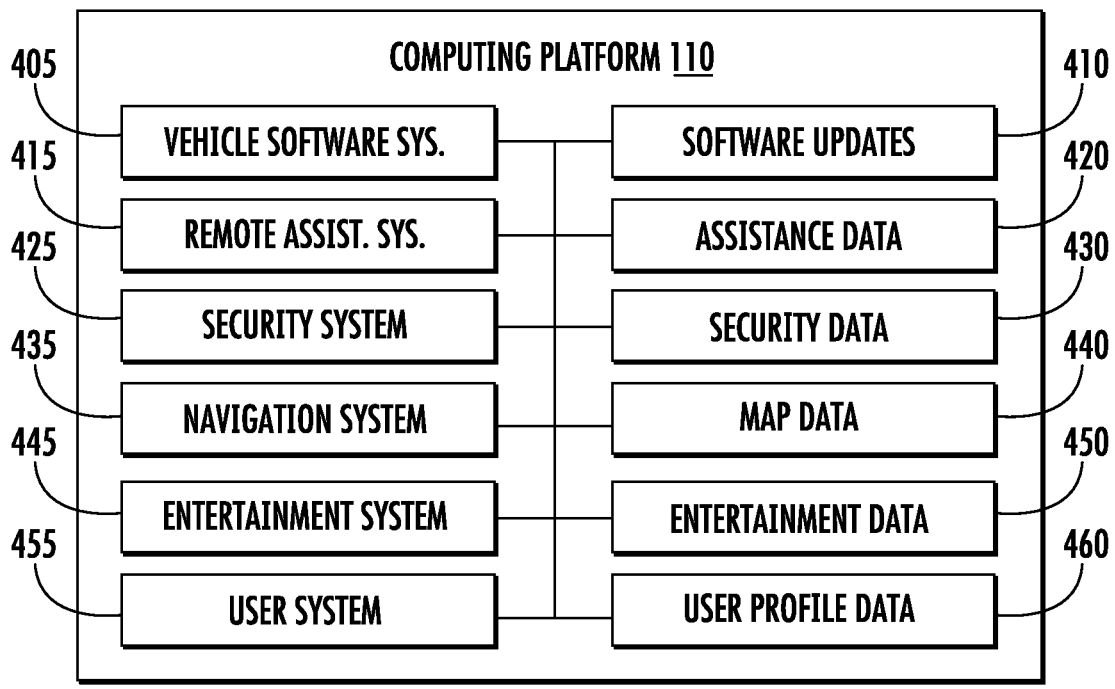
FIG. 4 illustrates a diagram of an example computing platform that is remote from a vehicle according to an embodiment hereof.

FIG. 4 illustrates a diagram of computing platform 110, which is remote from a vehicle according to an embodiment hereof. As described herein, the computing platform 110 may include a cloud-based computing platform.

In some implementations, the computing platform 110 may be implemented on a server, combination of servers, or a distributed set of computing devices which communicate over a network. For instance, the computing platform 110 may be distributed using one or more physical servers, private servers, or cloud computing. In some examples, the computing platform 110 may be implemented as a part of or in connection with one or more microservices, where, for example, an application is architected into independent services that communicate over APIs. Microservices may be deployed in a container (e.g., standalone software package for a software application) using a container service, or on VMs (virtual machines) within a shared network. Example, microservices may include a microservice associated with the vehicle software system 405, remote assistance system 415, etc. A container service may be a cloud service that allows developers to upload, organize, run, scale, manage, and stop containers using container-based virtualization to orchestrate their respective actions. A VM may include virtual computing resources which are not limited to a physical computing device. In some examples, the computing platform 110 may include or access one or more data stores for storing data associated with the one or more microservices. For instance, data stores may include distributed data stores, fully managed relational, NoSQL, and in-memory databases, etc.

The computing platform may include vehicle software 405. The vehicle software 405 may include local software running on the vehicle 105. This may include metadata such as the current vehicle software, eligible software updates for the vehicle, etc. The computing platform 110 may be responsible for ensuring that the vehicle 105 is running the most up to date vehicle software 405. For instance, the computing platform 110 may receive software updates 410 from the OEM and update the vehicle software 405. In an embodiment vehicle software 405 maintains parity with the software running on the vehicle computing system 200. In an embodiment, the vehicle software 405 includes machine-learned models running on the vehicle 105. For instance, the computing platform 110 may remotely train one or more machine-learned models running on the vehicle 105. An example of remotely training a machine-learned model is further described with reference to FIG. 8.

The computing platform 110 may include a remote assistance system 415. The remote assistance system 415 may provide assistance to the vehicle 105. This can include providing information to the vehicle 105 to assist with charging (e.g., charging locations recommendations), remotely controlling the vehicle 105 (e.g., for AV assistance), roadside assistance (e.g., for collisions, flat tires), etc. The remote assistance system 415 may obtain assistance data 420 to provide its core functions. The assistance data 420 may include information that may be helpful for the remote assistance system 415 to assist the vehicle 105. This may include information related to the vehicle's current state, an occupant's current state, the vehicle's location, the vehicle's route, charge/fuel level, incident data, etc. In some implementations, the assistance data 420 may include the vehicle data 335.

The remote assistance system 415 may transmit data or command signals to provide assistance to the vehicle 105. This may include providing data indicative of relevant charging locations, remote control commands to move the vehicle, connect to an emergency provider, etc.

The computing platform 110 may include a security system 425. The security system 425 can be associated with one or more security-related functions for accessing the computing platform 110 or the vehicle 105. For instance, security system 425 can process security data 430 for identifying digital keys, data encryption, data decryption, etc. for accessing the services/systems of the computing platform 110. Additionally, or alternatively, the security system 425 can store security data 430 associated with the vehicle 105. A user 120 can request access to the vehicle 105 (e.g., via the user device 115). In the event the request includes a digital key for the vehicle 105 as indicated in the security data 430, the security system 425 can provide a signal to lock (or unlock) the vehicle 105.

The computing platform 110 may include a navigation system 435 that provides a back-end routing and navigation service for the vehicle 105. The navigation system 435 may provide map data 440 to the vehicle 105. The map data 440 may be utilized by the positioning system 315 of the vehicle 105 to determine a location of the vehicle 105, a point of interest, etc. The navigation system 435 may also provide routes to destinations requested by the vehicle 105 (e.g., via user input to the vehicle's head unit). The routes can be provided as a portion of the map data 440 or as separate routing data. Data provided by the navigation system 435 can be presented as content on the display device 345 of the vehicle 105.

The computing platform 110 may include an entertainment system 445. The entertainment system 445 may access one or more databases for entertainment data 450 for a user 120 of the vehicle 105. In some implementations, the entertainment system 445 may access entertainment data 450 from another computing system associated with a third-party service provider of entertainment content. The entertainment data 450 may include media content such as music, videos, gaming data, etc. The entertainment data 450 may be provided to vehicle 105, which may output the entertainment data 450 as content 335 via one or more outputs devices of the vehicle 105 (e.g., display device, speaker, etc.).

The computing platform 110 may include a user system 455. The user system 455 may create, store, manage, or access user profile data 460. The user profile data 460 may include a plurality of user profiles, each associated with a respective user 120. The user profile data 460 may be updated based on information periodically provided by the vehicle 105. In some implementations, the user profile data 460 may be provided to the user device 120. A user profile may indicate various information about a respective user 120 including the user's preferences (e.g., for music, comfort settings, parking preferences), frequented/past destinations, past routes, etc. The user profiles may be stored in a secure database. In some implementations, when a user 120 enters the vehicle 105, the user's key (or user device) may provide a signal with a user or key identifier to the vehicle 105. The vehicle 105 may transmit data indicative of the identifier (e.g., via its communications system 325) to the computing platform 110. The computing platform 110 may look-up the user profile of the user 120 based on the identifier and transmit user profile data 460 to the vehicle computing system 200 of the vehicle 105. The vehicle computing system 200 may utilize the user profile data 460 to implement preferences of the user 120, present past destination locations, etc. For instance, the vehicle 105 may include a machine-learned model configured to predict preferences of the user 120. In some implementations, the machine-learned model may determine a user is associated with a machine-learned model that has been trained to predict the user preferences of the user 120 based on the user profile data 460.

By way of example, the user 120 may enter the vehicle 105, the computing platform 110 may look-up the user profile of the user 120 and determine the user has operated and trained a machine-learned model of a second vehicle. The vehicle computing system 200 may receive the trained machine-learned from the computing platform 110 and replace the machine-learned model in the vehicle 105. An example of replacing a machine-learned model in a vehicle 105 or syncing machine-learned models across multiple vehicles 105 is further described with reference to FIG. 9.

Figure 5:
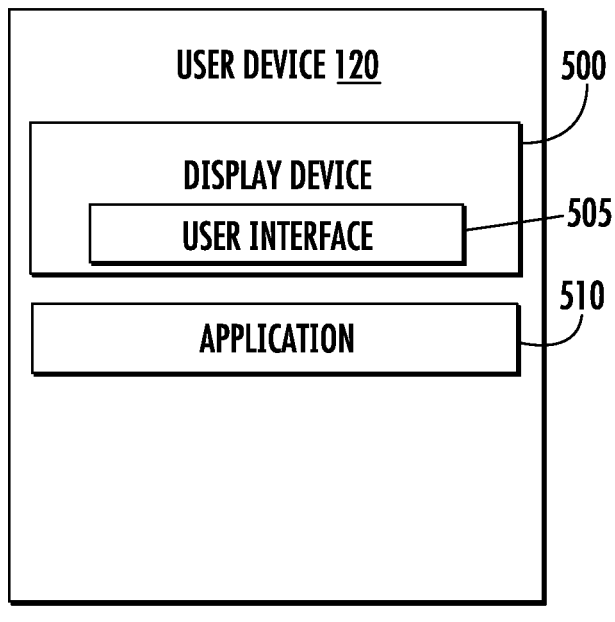
FIG. 5 illustrates a diagram of an example user device according to an embodiment hereof.

FIG. 5 illustrates a diagram of example components of user device 115 according to an embodiment hereof. The user device 115 may include a display device 500 configured to render content via a user interface 505 for presentation to a user 120. The display device 500 may include a display screen, AR glasses lens, CRT, LCD, plasma screen, touch screen, TV, projector, tablet, or other suitable display components. The user device 115 may include a software application 510 that is downloaded and runs on the user device 115. In some implementations, the software application 510 may be associated with the vehicle 105 or an entity associated with the vehicle 105 (e.g., manufacturer, retailer, maintenance provider). In an example, the software application 510 may enable the user device 115 to communicate with the computing platform 110 and the services thereof.

The user device 115 may be configured to pair with the vehicle 105 via a short-range wireless protocol. The short-range wireless protocol may include, for example, at least one of Bluetooth®, Wi-Fi, ZigBee, UWB, IR. The user device 115 may pair with the vehicle 105 through one or more known pairing techniques. For example, the user device 115 and the vehicle 105 may exchange information (e.g., addresses, device names, profiles) and store such information in their respective memories. Pairing may include an authentication process whereby the user 120 validates the connection between the user device 115 and the vehicle 105.

Once paired, the vehicle 105 and the user device 115 may exchange signals, data, etc. through the established communication channel. For example, the head unit 347 of the vehicle 105 may exchange signals with the user device 115.

The technology of the present disclosure allows the vehicle computing system 200 to extend its computing capabilities by leveraging the computing resources of the remote computing platform 110. More particularly, the vehicle computing system 200 may leverage the remote computing platform to remotely train a machine-learned model. As described herein, this technology can overcome potential inefficiencies introduced by limiting training of machine-learned models to data generated on-vehicle. Additionally, the technology preserves the privacy and sensitivity of data generated on-vehicle while also extending the ability of the vehicle 105 to remotely train a machine-learned model for use in a second vehicle 105.

Figure 6:
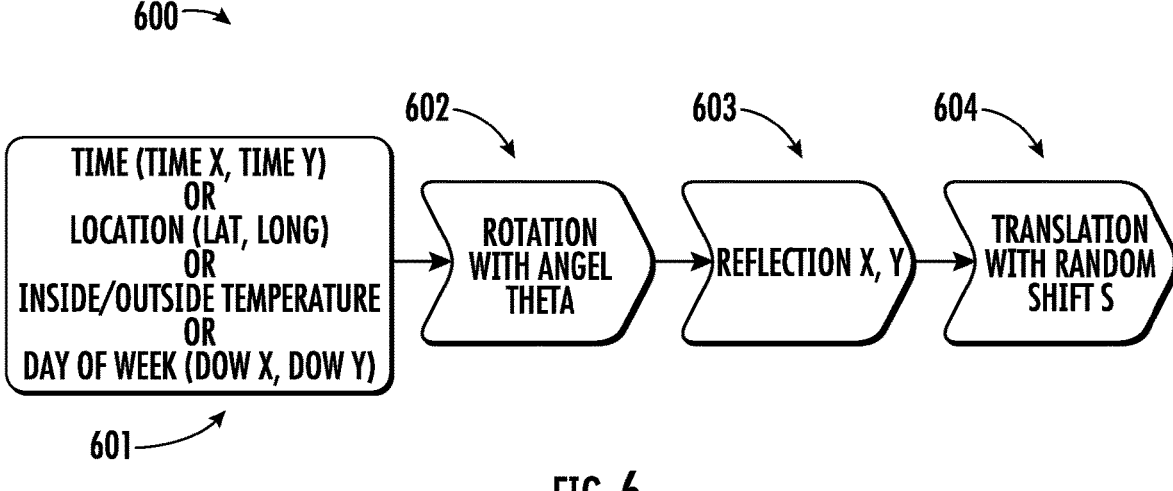
FIG. 6 illustrates an example flow diagram of a data transformation according to an embodiment hereof.

FIG. 6 illustrates an example flow diagram of an isometric transformation according to an embodiment hereof. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 6 is described with reference to elements/terms described with respect to other systems and figures, for example illustrated purposes and is not meant to be limiting. One or more portions of method 600 may be performed additionally, or alternatively, by other systems. For example, method 600 may be performed by a control circuit of the vehicle computing system 200.

In an embodiment, the method 600 may begin or otherwise include an operation 601, in which a random transformation generator within the vehicle computing system 200 analyzes a data point and converts the context to two dimensional space. The random transformation generator may include software running on the domain computers 220 of the vehicle 105. For example, the domain computers 220 may host various functionalities of the vehicle 105 such as the vehicle's intelligent functionality (e.g., machine-learned models, etc.). The random transformation generator may analyze a data point generated in Euclidean space based on an action taken by the user 120 or the vehicle 105. By way of example, a data point may be generated when the user 120 adjusts one or more positions of a seat within the vehicle interior prior to beginning operation of the vehicle 105. The action of adjusting the seat position may be generated in a Euclidean space (e.g., multi-dimensional) which includes the time of day, day of week, location, temperature, or any other context associated with the action.

In an embodiment, one or more contexts of the data point may need to be converted into two dimensional space. For instance, time of day may be converted to circular features of time x and time y based on the example transformation which assumes that time represents the hour of the day.

$$time_x = Cos\left(\frac{2\pi\ time}{24}\right)$$

$$time_y = Sin\left(\frac{2\pi\ time}{24}\right)$$

In an embodiment, a similar transformation may be applied for the day of the week. For instance, the day of the week may be converted to circular features based on the example transformation:

$$dow_x = Cos\left(\frac{2\pi\ dow}{7}\right)$$

$$dow_y = Sin\left(\frac{2\pi\ dow}{7}\right)$$

In an embodiment, one or more features may not require a conversion into two dimensional space. For instance, features such as location or temperature may natively include two dimensions. For example, location may be expressed as latitude and longitude coordinates. In another example, the temperature may be expressed as an inside (e.g., vehicle interior) temperature and an outside (e.g., vehicle exterior) temperature.

In an embodiment, the method 600 may continue or otherwise include an operation 601 in which the random transformation generator executes a rotation transformation with angle theta (θ). A rotation may include a type of transformation in which a point rotates in a certain number of degrees around a given point. An example given point may include the origin of the x and y axis of the two dimensional space. For instance, the random transformation generator may generate a rotation key to rotate each circular feature (e.g., context) around the origin of the x, y axis. The rotation key may be a random angle θ.

By way of example, the random transformation generator may randomly generate a rotation angle of 17 degrees to rotate the time circular feature represented by time x and time y. The coordinate point time point of x, y may be rotated 17 degrees clockwise or counterclockwise around the origin to transform the time feature. In some examples, the random transformation generator may uniformly apply a random angle θ to each of the circular features. For instance, a rotation angle of 17 may be independently applied to the time feature, location (e.g., latitude and longitude), temperature (e.g., inside and outside), etc. In other examples, the random transformation generator may randomly apply a random angle θ to each of the circular features. For instance, the random transformation generator may randomly generate an angle of 25 degrees, 82 degrees, 56 degrees, and 18 degrees and apply to the time feature, location feature, temperature feature, and day of week feature respectively. The rotation may rotate the respective features around the origin of the two-dimensional space.

The random transformation generator may generate a rotation key based on the rotation transformation. A rotation key may indicate the random angle θ and the features where the random angle θ was applied. For instance, the rotation key may indicate that the time feature was rotated by a 23 degree angle. In an embodiment, the rotation key may be used to generate a feature masking key. A feature masking key may indicate transformations applied to a respective feature. For instance, the random transformation generator may apply a rotation transformation and generate a rotation key. In some examples, the random transformation generator may additionally apply at random a reflection transformation, translation transformation, etc. and generate respective masking keys (e.g., transformation keys). A feature masking key may include the rotation key and any other randomly selected transformation keys. For example, a feature masking key may include all transformation keys indicating respective randomly applied transformation for a feature. In an embodiment, feature masking keys may be used to generate a masking signature. An example of a masking signature is further described with reference to FIG. 7

In an embodiment, the method 600 may continue or otherwise include an operation 602, in which the random transformation generator executes a reflection transformation. A reflection may include a type of transformation in which two coordinate points flip (e.g., reflect). For instance, the day of the week feature may be represented as dow x, dow y. In some examples, a reflection transformation may flip a feature across a line (e.g., x or y axis).

By way of example, the time feature may be represented as circular features of time x, time y. In some examples, x and y may both be positive values. For instance, time x, time y may be positioned within quadrant I in a two dimensional space. The random transformation generator may execute a reflection transformation to transform circular time features such as positive "time x, time y" to "negative time x, time y. For instance, circular features "time x, time y" may be reflected across the origin to quadrant III which includes both "negative x" and "negative y" values. In some examples, the random transformation generator may apply a reflection transformation to each of the features. In some examples, the random transformation may randomly select features to apply a reflection transformation. For instance, the temperature feature and time feature may be reflected and only a rotation or translation transformation may be applied to the location and day of the week features.

The random transformation generator may generate a reflection key based on the reflection transformation. A reflection key may indicate the reflection transformation was applied to a respective feature. For instance, the reflection key may indicate that that the time feature was reflected across the x axis.

The reflection key may be used to generate a feature masking key. For instance, the random transformation generator may apply a reflection transformation to a location feature and generate a reflection key. In some examples, the random transformation generator may additionally apply, at random, a rotation transformation, translation transformation, etc. and generate respective masking keys. A feature masking key may include the reflection key and any other randomly selected transformation keys applied to a feature. For example, a feature masking key may include all transformation keys indicating respective randomly applied transformation for a feature. In an embodiment, feature masking keys may be used to generate a masking signature. An example of a masking signature is further described with reference to FIG. 7.

In an embodiment, the method 600 may continue or otherwise include an operation 603 in which the random transformation generator executes a translation transformation. For instance, the random transformation generator may execute a translation with a random shift (o). A translation may include a type of transformation in which a point shifts in one or more directions. For example, the random transformation generator may execute a translation transformation and shift one or more circular features a random distance.

By way of example, a data point may be generated based on the vehicle 105 predicting and tuning a radio station for the user 120 who enters the vehicle 105 at 7 AM (e.g., time), at their home (e.g., location), on a Tuesday (e.g., day of week). Context (e.g., time, location, day of week) associated with the predicted radio station may be extracted and represented in circular features. In an embodiment, the random transformation generator may execute a translation with a random shift (σ) to shift the location feature. For instance, the random transformation generator may transform the data point to indicate the predicted radio station action occurred at 7 AM, at a home in a distant country, on a Tuesday. In some examples, the translation transformation may shift the data point such that respective features shift in the same direction at the same time. For instance, the random transformation generator may transform the data point to indicate the predicted action occurred at 8 AM, at an adjacent home, on a Wednesday. For example, the translation may shift respective features by a distance measurement of +1.

The translation transformation generator may generate a translation key based on the translation transformation. A translation key may indicate the translation transformation was applied to a respective feature and the random shift (σ). For instance, the translation key may indicate that the temperature was shifted by a distance of 2 for x and 6 for y. The translation key may be used to generate a feature masking key. For instance, the random transformation generator may apply a translation transformation to the temperature feature and generate a translation key. In some examples, the random transformation generator may additionally apply at random a rotation transformation, reflection transformation, etc. and generate respective masking keys. A feature masking key may include the translation key and any other randomly selected transformation keys applied to a feature. For example, a feature masking key may include all transformation keys indicating respective randomly applied transformation for a feature. In an embodiment, feature masking keys may be used to generate a masking signature.

In an embodiment, the method 600 may generate a transformed data point. For instance, the transformed data point may obscure the original context of the original data point (e.g., ground truth input). In some examples, the transformed data point may maintain its spatial distance relative to other data points. By way of example, the random transformation generator may transform a plurality of data points. For instance, data points may be generated based on the user 120 or the vehicle performing actions over a period. In some examples, the data points may be plotted in Euclidean space and have a multi-dimensional spatial distance from other data points. In some examples, the transformed data points may maintain the same multi-dimensional spatial distance as the original data points. For example, the random transformation generator may apply a randomly generated set of transformations across a plurality of data points. In an embodiment, the random transformation generator may transform a dataset (e.g., plurality of data points) by applying the randomly generated set of transformations such that the original data set (e.g., ground truth data) and the transformed data set (e.g., plurality of transformed data points, ground truth input, etc.) maintain the same spatial relationship.

In an embodiment, the randomly generated set of transformations may be associated with a masking signature. For instance, the masking signature may indicate the randomly generated set of transformations (e.g., transformation keys). In some examples, newly generated data points may be transformed by the random transformation generator by applying the randomly generated set of transformations. An example of applying randomly generated set of transformations (e.g., masking per feature) is further described with reference to FIG. 7.

Figure 7:
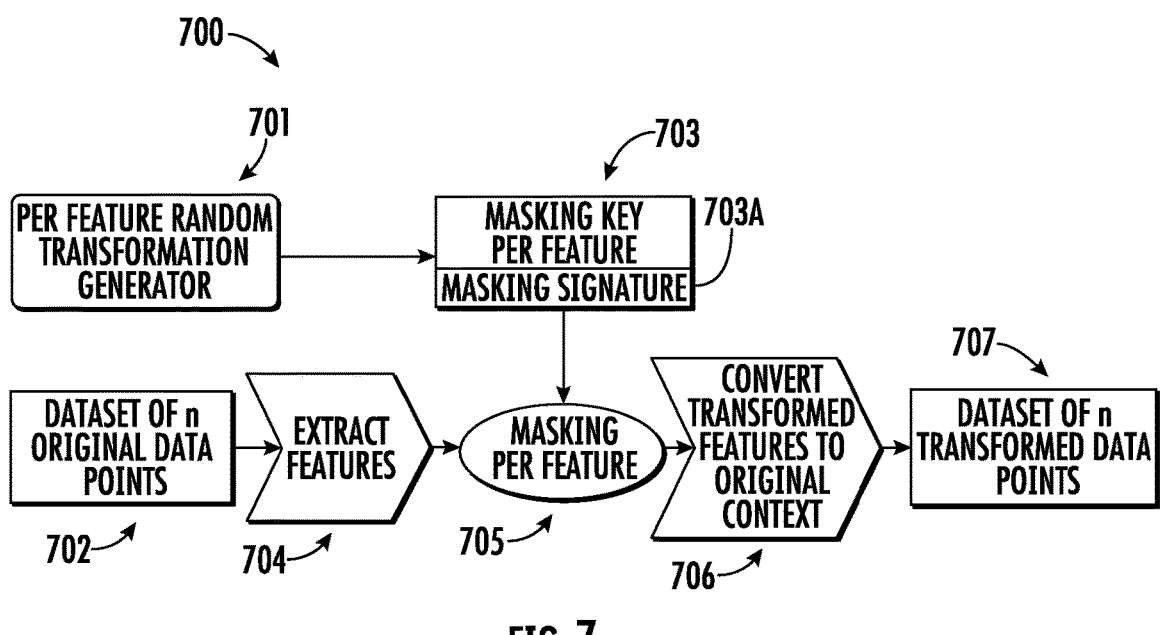
FIG. 7 illustrates an example flow diagram of a data transformation according to an embodiment hereof.

FIG. 7 illustrates an example flow diagram of a vehicle data transformation according to an embodiment hereof.

Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 7 is described with reference to elements/terms described with respect to other systems and figures, for example illustrated purposes and is not meant to be limiting. One or more portions of method 700 may be performed additionally, or alternatively, by other systems. For example, method 700 may be performed by a control circuit of the vehicle computing system 200.

In an embodiment, the method 700 may begin or otherwise include an operation 701, in which a random transformation generator within the vehicle computing system 200 executes a random transformation for each feature associated with a data point. For instance, the random transformation generator may convert context associated with a data point to two dimensional space, execute one or more isometric transformations (e.g., rotations, reflections, translations, etc.), and generate a respective masking key for the feature. In an embodiment, the masking keys may be used to generate a masking signature 703A.

In some examples, operation 701 may be executed against a dataset of data points. For instance, the random transformation generator may utilize a training data set indicating a simulated data points. In some examples, the random transformation generator may utilize a plurality of datapoints previously generated by the user 120 or vehicle 105.

In an embodiment, the method 700 may continue or otherwise include an operation 703, in which a random transformation generator within the vehicle computing system 200 generates a masking key for respective features and generates a masking signature 703A. For example, the random transformation generator may compile one or more transformation keys applied to a feature. For instance, the random transformation generator may apply a rotation, reflection, and translation transformation to the day of the week feature. In some examples, a rotation key, reflection key, and translation key may be generated to indicate the applied transformations. The randomly generated set of transformation keys may be used to generate a masking key for each feature.

Once the random transformation generator compiles or packages all of the transformation keys, the masking keys may be hashed to generate a masking signature 703A. Hashing may include transforming the transformation keys into another value. For instance, the random transformation generator may hash the compiled masking keys into a fixed length value or key which is shorter than the original transformation keys. In some examples, hashing the compiled transformation keys generates a unique value for the original transformation keys. Example hashing techniques may utilize a hashing algorithm (e.g., one-directional mathematical formula) to generate unique values.

By way of example, the random transformation generator may generate masking keys for the time, location, temperature, and day of week features associated with a plurality of data points. Each feature may be transformed by one or more randomly selected transformations and a masking key may be generated indicating the randomly selected transformations applied to the feature. In some examples, the masking keys for each of the transformed features may be hashed to generate a masking signature 703A. The masking signature 703A may be used to identify the masking keys (e.g., set of randomly selected transformations applied to respective features).

In an embodiment, the masking keys and masking signature 703A may be used to provide a layer of privacy and security for a plurality of data points. For instance, the original data points (e.g., ground truth data) may include sensitive data about a user 120 who generated the data points. For instance, the data points may indicate the user's home, workplace, frequently visited locations, etc. In an embodiment, applying randomly selected isometric transformations may obscure personal or private information indicated by data points. For instance, the randomly applied transformations may generate an obscured representation of the original data. In an embodiment, the masking keys indicating the randomly generated set of transformations may further obscure personal or sensitive data points. For instance, compiling the masking keys and hashing the key values may increase the difficulty of deriving any information about the input (e.g., identifying the randomly generated set of transformations). In some examples, the masking signature 703A which identifies the masking keys may allow a machine-learned model to be remotely trained on the transformed data points without exposing the sensitivity or privacy of the data. For instance, the transformed data points may maintain the same spatial relationship as the original data point while obscuring private or sensitive information. An example of remotely training a machine-learned model using transformed data points is further described with reference to FIG. 8.

In an embodiment, the method 700 may continue or otherwise include an operation 702, in which the vehicle computing system 200 generates a dataset of original datapoints. For instance, the user 120 may interact with the vehicle and generate a plurality of original datapoints. Original datapoints may indicate actual actions taken by the user 120 with respect to the vehicle 105. For example, the user 120 may enter the vehicle 105 Monday-Friday at 8 AM during winter month (e.g., December-March) where the temperature is below 40 degrees Fahrenheit and activate a seat warming feature to warm a seat in the vehicle interior. The vehicle computing system 200 may generate an original data point for each time the user 120 takes this action and capture context (e.g., time, location, temperature, day of week, etc.) associated with the action.

In an embodiment, the vehicle computing system 200 may include one or more machine-learned models configured to learn and predict actions of the user 120. For instance, a machine-learned model may predict the seat warming action based on the context (e.g., time, location, temperature, day of week, etc.) and utilize one or more controllers 355A, 355B, 355C to activate the seat warming vehicle function (e.g., vehicle function 520A, 350B, 350C). In some examples, an original data point may be generated based on the predicted action. For instance, the machine-learned model may predict the seat warming action and display via the display device 345 a suggestion to activate the seat warming vehicle function. In some examples, the user 120 may accept or reject the suggestion via the display device 345 and a data point may be generated indicating the action or inaction taken.

In an embodiment, the method 700 may continue or otherwise include an operation 704, in which the vehicle computing system 200 extracts features (e.g., context) from the plurality of original data points. For instance, the vehicle computing system 200 may analyze a plurality of data points generated by the user 120 and the vehicle and extract features indicating context associated with the action. In some examples, the features may be extracted and converted into two dimensional space. In some examples, the features may natively be extracted into two-dimensional space.

In an embodiment, the method 700 may continue or otherwise include an operation 705, in which the vehicle computing system 200 accesses masking keys for respective features of the plurality of original data points. For instance, the random transformation generator may generate a masking key for each feature associated with a plurality of data points. In some examples, the random transformation generator may generate masking keys for features associated with original datapoints. For instance, data points associated with the vehicle computing system may include a consistent set of features such that masking keys generated by the random transformation generator may be applied to a dataset of original data points. For instance, the vehicle computing system 200 may apply the masking key (e.g., randomly selected set of transformations) to the plurality of original datapoints (e.g., newly generated data points).

In an embodiment, the method 700 may continue or otherwise include an operation 706, in which the vehicle computing system 200 converts the transformed features back into original context. For example, features may be transformed by applying the masking keys for each feature associated with original data points in a dataset. In an embodiment, the transformed features may not include the original context (e.g., ground truth). For instance, transformed time x and time y may need to be converted back to transformed time. By way of example, the vehicle computing system 200 may access a masking key for the time feature indicating the random rotation and translation transformation used to mask the time feature across the plurality of original data points. The vehicle computing system 200, based on the masking keys, may convert the time feature back to original context. For instance, the transformed feature may maintain a spatial relationship to original features.

In an embodiment, the vehicle computing system 200 may iteratively mask features of original datapoints as the user 120 continues to generate datapoints. For instance, the masking signature 703A may identify the masking keys associated with the vehicle computing system 202. In some examples, the vehicle computing system 200 may mask features using updated masking keys. For instance, the user 120 may be associated with a second vehicle 105. The second vehicle 105 may include a different set of masking keys associated with a difference masking signature. In an embodiment, the vehicle computing system 200 may sync masking signatures with a second vehicle 105 and updated masking keys may be applied to the dataset of original data points. An example of syncing masking signatures 703A is further described with reference to FIG. 9.

In an embodiment, the method 700 may continue or otherwise include an operation 707, in which the vehicle computing system 200 applies the masking feature to each feature associated with the plurality of original data points and generates a dataset of transformed datapoints. The dataset may include a plurality of transformed datapoints which maintains the same spatial distance as the original data points. In some examples, the dataset of transformed datapoints may be used to train a machine-learn model running within the vehicle computing system 200. In some examples, the dataset of transformed data points may be used to remotely train a machine-learned model.

Figure 8:
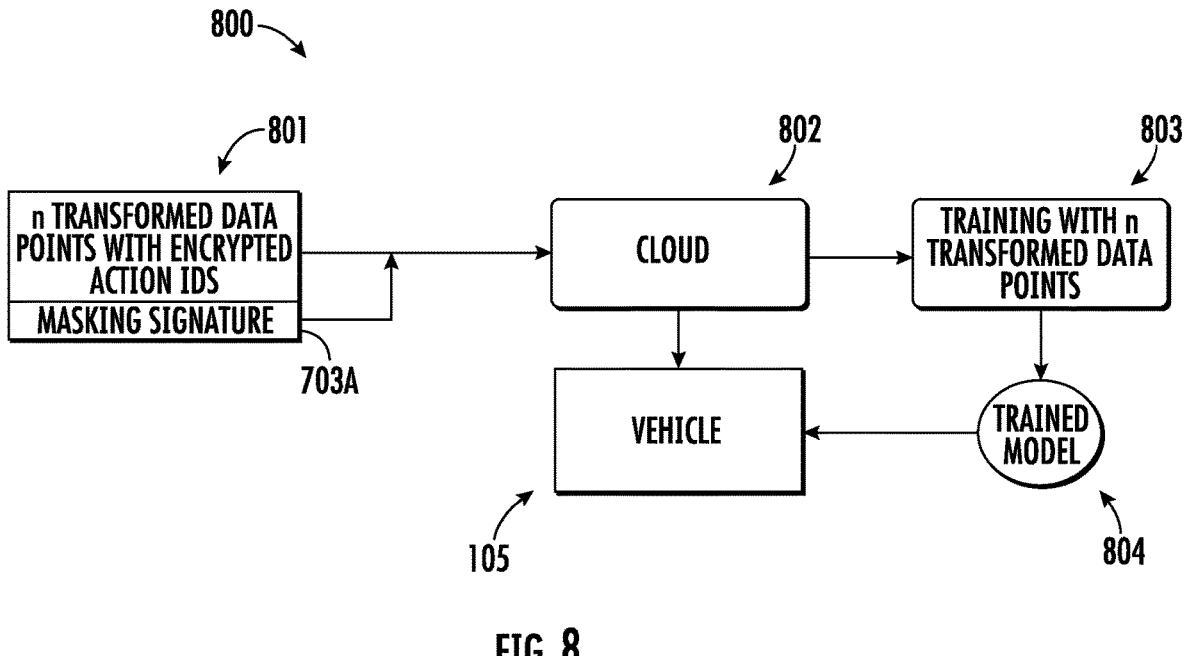
FIG. 8 illustrates an example flow diagram of an example training method according to an embodiment hereof.

FIG. 8 illustrates an example flow diagram of an example training method according to an embodiment hereof. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 8 is described with reference to elements/terms described with respect to other systems and figures, for example illustrated purposes and is not meant to be limiting. One or more portions of method 800 may be performed additionally, or alternatively, by other systems. For example, method 800 may be performed by a control circuit of the vehicle computing system 200 or the remote computing platform 110.

In an embodiment, the method 800 may begin or otherwise include an operation 801, in which the vehicle computing system 200 transmits a plurality of transformed data points (e.g., transformed data set), action ids, and masking signature 703A to a remote computing system. For instance, the vehicle computing system 200 may obtain a plurality of data points generated by the user 120 or the vehicle 105. For example, the user 120 may interact or operate the vehicle 105 by performing one or more actions. Original data points may be generated based on the operations (e.g., actions) executed by the vehicle 105 in response to user input. The vehicle computing system 200 may apply one or more masking keys generated by the random transformation generator to mask one or more features associated with the original data points. In some examples, the vehicle computing system 200 may obtain a plurality of transformed data points based on applying the masking key to the plurality of original data points.

In an embodiment, the plurality of transformed data points may be associated with an action id. An action id may include an identifier indicating the action associated with respective data points. An action id may include a string value, integer, computer generated key, etc. By way of example, a data point may be generated when a user 120 closes a sunroof of the vehicle 105 when parking at an outside location, while the temperature is above 80 degrees Fahrenheit. The datapoint may be associated with the vehicle operation (e.g., action) of closing the sunroof with the context of the location and the temperature. In some examples, features (e.g., context) associated with the data point may be transformed and an action id may be generated indicating the vehicle operation (e.g., action) of closing the sunroof. In an embodiment, the transformed data point and action id may obscure private or sensitive information associated with the data point. For instance, the action id may indicate a vehicle operation which occurred, but the transformed context may transform the datapoint to reflect obscured context such as the original location, time, temperature, etc.

In an embodiment, the action id may be encrypted to further obscure the action associated with the transformed data point. For instance, the action id may be encrypted via encryption techniques such as 256-bit encryption, 128-bit encryption, 192-bit encryption, etc. In an embodiment, the plurality of transformed data points may also be encrypted. For instance, the transformed data point and the action id may be encrypted using the same encryption key. In some examples, the masking signature 703A indicating the masking keys applied to respective features associated with the plurality of transformed data points may also be encrypted. For instance, the masking keys indicating the randomly selected transformations applied to each feature may be hashed to generate the masking signature 703A. In some examples, the masking signature 703A (e.g., hashed masking keys) may be further encrypted to provide an additional layer of security. In some examples, the vehicle computing system 200 may transmit the plurality transformed data points, encrypted action ids, and masking signature 703A to a remote computing system.

In an embodiment, the method 800 may continue or otherwise include an operation 802, in which a remote computing system receives the plurality transformed data points, encrypted action ids, and masking signature 703A. For instance, the remote computing system may be a remote cloud computing system. For example, the remote computing system may be the remote computing platform 110, third-party computing platform, or any other remote computing system. In an embodiment, the remote computing system may include one or more model trainers to train a machine-learned model. For instance, the remote computing system may be a training computing system configured to train one or more machine-learned models. An example of a training computing system is further described with reference to FIG. 13.

In an embodiment, the method 800 may continue or otherwise include an operation 803, in which the remote computing system trains a machine-learned model using the plurality of transformed data points. For instance, the remote computing system may include a machine-learned model. The machine-learned model may be an instance of the machine-learned model running on the vehicle computing system.

In an example, the model may be a user preference prediction model, or any machine-learned model trained to predict a vehicle action. The model can be or can otherwise include various machine-learned models such as, for example, regression networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks. The one or more models can be trained through the use of one or more model trainers and training data.

For example, the plurality transformed data points may be used as training data to train one or more machine-learned models within the remote computing system. In an embodiment, the remote computing system may receive a plurality of datasets including transformed data points. For instance, a user 120 may be associated with a plurality of vehicles 105 and a plurality of datasets including transformed data points may be transmitted to the remote computing system to train one or more machine-learned models on a combined dataset of transformed data points. An example of the remote computing system training a machine-learned model using a combined data set of transformed data points is further described with reference to FIG. 9.

In an embodiment, the remote computing system may train one or more machine-learned models without insight into the context of the original data points. For instance, the plurality transformed data points may maintain the same spatial relationship as original datapoints and may be associated with the same action id. For example, the remote computing system may utilize the transformed data point and an encrypted action id to train one or more machine-learned models as if the transformed data points are original data points.

By way of example, the remote computing system may receive a plurality of transformed data points with associated encrypted action ids indicating the user 120 made a phone call at 6 PM, 1200 feet away from a grocery store location, on each day of the work week (e.g., Monday-Friday). In an embodiment, the original data point may be associated with an action indicating the user 120 made a phone call at 4:30 PM, 2 miles away from a school, each day of the work week (e.g., Monday-Friday). For instance, the vehicle computing system 200 may randomly mask the context (e.g., features) across the plurality of data points associated with the phone call action such that the transformed data points maintain the same spatial relationship (e.g., indication of phone call action near a location).

The remote computing system may train a machine-learned model based on the transformed data points and encrypted action id. For example, the remote computing system may train a machine-learned model to predict a phone call action each time similar conditions (e.g., context of 6 PM, 1200 feet away from a grocery store location, Monday-Friday) is true. For instance, the predicted action generated by the remotely trained machine-learned model may be associated with the encrypted action id the remote computing system used to train.

In an embodiment, the trained machine-learned model may be utilized by the vehicle computing system 200 to accurately adjust the transformed features (e.g., context) to predict a phone call action each time similar conditions (e.g., context) associated with the original data point are true. For instance, the vehicle computing system 200 may store the decryption keys used to encrypt the action ids. For example, the vehicle computing system 200 may decrypt action ids generated by the remotely trained machine-learned model. In some examples, the decrypted action id may indicate a predicted action for the vehicle 105 to execute.

In an embodiment, the method 800 may continue or otherwise include an operation 804, in which the remote computing system transmits the trained machine-learned model to the vehicle 105. For instance, the vehicle 105 may include an instance of the trained machine-learned model. In some examples, the remote computing system may replace the machine-learned model running on the vehicle 105 with the trained machine-learned model. In some examples, the vehicle 105 may utilize the trained machine-learned model to predict actions to be executed by the vehicle 105. Example actions may include controlling, via the controllers 355A, 355B, 355C one or more vehicle functions 350A, 350B, 350C.

Figure 9:
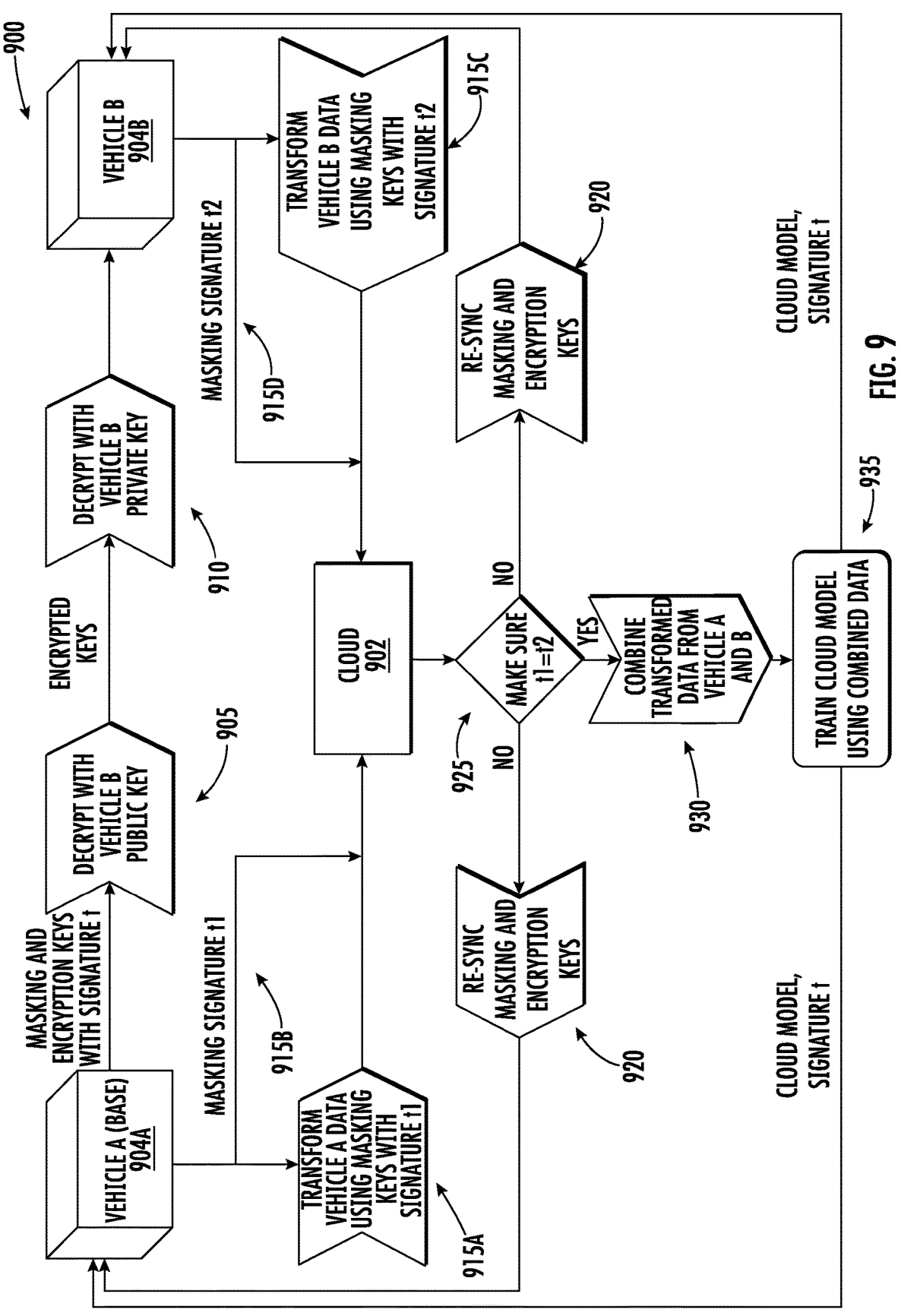
FIG. 9 illustrates an example flow diagram of an example training method according to an embodiment hereof.

FIG. 9 illustrates an example flow diagram of an example training method according to an embodiment hereof. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 9 is described with reference to elements/terms described with respect to other systems and figures, for example illustrated purposes and is not meant to be limiting. One or more portions of method 900 may be performed additionally, or alternatively, by other systems. For example, method 900 may be performed by a control circuit of the vehicle computing system 200 or the remote computing platform 110.

In an embodiment, the method 900 may begin or otherwise include an operation 915A in which a base vehicle 105A transforms vehicle operations data including a plurality of original data points into a transformed vehicle operations data (e.g., plurality of transformed data points). For instance, the base vehicle 105A may include a random transformation generator within a vehicle computing system

200. The random transformation generator may generate masking keys for respective features associated with the plurality of original data points included in the vehicle operations data. In some examples, the vehicle computing system 200 may generate masked vehicle operations data by applying the masking keys to respective features associated with the plurality of original data points. The vehicle computing system 200 may generate a masking signature 915B based on the masking keys. For instance, the vehicle computing system 200 may compile and hash the masking keys to generate the masking signature 915B.

The transformed vehicle operations data (e.g., plurality of transformed data points) and masking signature 915B may be transmitted to the cloud 902 where a machine-learned model may be trained using the transformed vehicle operations data. In an embodiment, action ids may be encrypted and transmitted to the cloud 902. For instance, the plurality of transformed data points may be associated with an action taken by the user 120 or executed by a first vehicle 904A (e.g., corresponding to vehicle 105). The vehicle computing system 200 may encrypt the action id and transmit the action id to the cloud 902. The cloud 902 may be a remote computing system such as the remote computing platform 110, third-party computing platform 125, or any other cloud based system. In an embodiment the cloud 902 may be a cloud training computing system configured to train one or more machine-learned models to predict vehicle actions.

In an embodiment, the method 900 may begin or otherwise include an operation 915C in which a second vehicle 904B associated with the user 120 transforms vehicle operations data including a plurality of original data points into a transformed vehicle operations data (e.g., plurality of transformed data points). For instance, the second vehicle 904B may include a random transformation generator with a vehicle computing system 200. The random transformation generator may generate masking keys for respective features associated with the plurality of original data points included in the vehicle operations data. In some examples, the vehicle computing system 200 may generate masked vehicle operations data by applying the masking keys to respective features associated with the plurality of original data points. The vehicle computing system 200 may generate a masking signature 915D based on the masking keys. For instance, the vehicle computing system 200 may compile and hash the masking keys to generate a masking signature 915D.

The transformed vehicle operations data (e.g., plurality of transformed data points) and masking signature 915D may be transmitted to the cloud 902 where a machine-learned model may be trained using the transformed vehicle operations data. In an embodiment, action ids may be encrypted and transmitted to the cloud 902. For instance, the plurality of transformed data points may be associated with an action taken by the user 120 or executed by the vehicle 105B. The vehicle computing system 200 may encrypt the action id and transmit the action id to the cloud 902.

In an embodiment, the method 900 may begin or otherwise include an operation 925 in which the cloud 902 may train a machine-learned model using transformed data from vehicle 105A and vehicle 105B. For instance, the cloud 902 may receive transformed vehicle operations data from first vehicle 904A, second vehicle 904B and associated masking signatures 915B, 915D. The cloud 902 may determine that masking signature 915B matches the masking signature 915D.

By way of example, the first vehicle 904A and second vehicle 904B may be associated with the same user 120. For instance, the user 120 may be authenticated with first vehicle 904A and generate vehicle operations data (e.g., plurality of original data points) within first vehicle 904A. A random transformation generator may transform the vehicle operations data within the first vehicle 904A and generate transformed vehicle operations data using feature masking keys, a masking signature 915B, and encrypt action ids using an encryption key. The user 120 may also be authenticated with the second vehicle 904B and generate vehicle operations data (e.g., plurality of original data points) within second vehicle 904B. A random transformation generator may transform the vehicle operations data and generate transformed vehicle operations data using the feature masking keys, masking signature 915D, and encrypt action ids using an encryption key. In an embodiment, a random transformation generator may transform the vehicle operations data using the same feature masking keys for both first vehicle 904A and second vehicle 904B. For instance, the masking signature 915B and masking signature 915D may match. In some examples, the action ids may be encrypted using the same encryption keys. For instance, the random transformation generator within the first vehicle 904A and second vehicle 904B may be configured to determine, based on the user 120 being authenticated with the first vehicle 904A or the second vehicle 904B, feature masking keys and encryption keys unique to the user 120. For example, a user 120 may be associated with a set of unique masking keys and a corresponding masking signature. In some examples, a user 120 may be associated with a set of randomly generated set of feature masking keys and encryption keys such that for each vehicle (e.g., first vehicle 904A, second vehicle 905B, etc.), the user 120 authenticates with masked vehicle operations data using the same set of feature masking keys and encryption keys. In some examples, using the same set of feature masking keys and encryption keys may result in the same masking signature (e.g., masking signature 915B, 915D) for transformed data generated by a vehicle computing system 200.

In an embodiment, the method 900 may continue or otherwise include an operation 930 in which the cloud 902, generates a combined data set from first vehicle 904A and second vehicle 904B based on determining that the masking signature 915B associated with transformed vehicle operations data received from first vehicle 904A and the masking signature 915D associated with transformed vehicle operations data received from second vehicle 904B match. For instance, the cloud 902 may augment or supplement the transformed vehicle operations data received from first vehicle 904A with transformed vehicle operations data received from second vehicle 904B due to the masking signature indicating that the vehicle operations data from the first vehicle 904A and second vehicle 904B have been transformed using the same feature masking keys and encryption keys.

By way of example, the first vehicle 105A and the second vehicle 105B may generate transformed vehicle operations data using the same randomly generated transformations to obscure features (e.g., context) associated with actions represented by datapoints. The transformed vehicle operations data from both the first vehicle 105A and second vehicle 105B may maintain the same spatial relationship as original datapoints generated by the respective vehicle (e.g., first vehicle 105A, second vehicle 105B). For instance, the cloud 902 may combine the transformed data set from both the first vehicle 105A and the second vehicle 105B while maintaining the same spatial relationship as the original datapoints. In an embodiment, the combined transformed vehicle operations data set may obscure private or sensitive information.

For instance, the original data points may be consistently transformed using the randomly generated feature masking keys. In some examples, the masking signature may identify the set of randomly generated transformations.

In an embodiment, the method 900 may begin or other- wise include an operation 935 in which the cloud 902 trains a cloud machine-learned model for both the first vehicle 105A, the second vehicle 105B, and transmits the trained cloud model to the vehicles 105A, 105B. For instance, the cloud 902 may train a cloud machine-learned model on a combined data set from both the first vehicle 105A and second vehicle 105B. In some examples, the cloud 902 may train the cloud model without being exposed to personal or sensitive information indicated by the original data points for the respective vehicle (e.g., first vehicle 105A, second vehicle 105B). For instance, the cloud may train a cloud machine-learned model using the combined dataset from the first vehicle 105A and second vehicle 105B. The combined dataset may include transformed vehicle operations data which obscures personal or sensitive context (e.g., features) associated with the original data points.

The cloud 902 may transmit the cloud model trained on the combined dataset to the first vehicle 105A and second vehicle 105B. For instance, the cloud 902 may train the cloud model and the user 120 may be authenticated with the second vehicle 105B. Once the user 120 is authenticated with the second vehicle 105B, the cloud 902 may transmit the trained cloud model to the second vehicle 105B. In some examples, the cloud 902 may transmit the trained cloud model to the first vehicle 105A or second vehicle 105B without the user 120 being authenticated. For instance, the first vehicle 105A may be associated with a single user profile associated with the user 120. In some examples, the single user profile may indicate that the user 120 is the only vehicle operator (e.g., user 120) associated with the first vehicle 105A. In an embodiment, the first vehicle 105A may periodically request OTA (over the air software) updates from the remote computing platform 110 including the latest trained cloud model. For instance, the first vehicle 105A may poll the remote computing platform 110 (e.g., cloud 902) to request the latest version of the cloud trained model.

The cloud 902 may transmit the trained cloud model and a cloud model signature associated with the masking signature (e.g., masking signature 915B, 915D) of the transformed data used to train the cloud model. For instance, the cloud model signature may indicate the masking signatures 915B, 915D associated with the training data (e.g., transformed data set) used to train the cloud model.

In an embodiment, the method 900 may begin or other- wise include an operation 920 in which the cloud 902 re-syncs masking and encryption keys with first vehicle 105A and the second vehicle 105B. For instance, the first vehicle 105A and second vehicle 105B may include machine-learned models trained to predict actions for a respective user 120. In an embodiment, the first vehicle 105A or second vehicle 105B may be operated by a second user 120 and the random transformation generator may generate masking keys, encryption keys, and a masking signatures for the second user 120. In some examples, the masking signatures associated with a first user 120 may desynchronize.

By way of example, the cloud may determine the masking signature 915B associated with the first vehicle 105A does not match the masking signature 915D associated with vehicle 105B and may transmit one or more command instructions to the first vehicle 105A to regenerate masking keys, encryption keys, and a masking signature. For instance, the first vehicle 105A may utilize a random trans- formation generator to regenerate an updated masking sig- nature associated with the user 120. The first vehicle 105A may apply the regenerated masking keys to original data points and regenerate transformed vehicle operations data. For example, the user 120 may interact with the first vehicle 105A, generate original data points and the vehicle comput- ing system 200 may apply the regenerated masking keys and encryption keys to regenerate transformed vehicle opera- tions data.

In an embodiment, the method 900 may an operation 905 in which the first vehicle 105A transmits the regenerated masking keys, encryption keys to the second vehicle 105B to resync the masking signature. For instance, the cloud 902 may not have access to the masking keys or encryption keys to prevent unauthorized remote decryption of transformed data. In some examples, the first vehicle 105A and second vehicle 105B may directly communicate with each other over one or more networks (e.g., network 130). In other examples, the first vehicle 105A and the second vehicle 105B may communicate via near field or short range com- munication techniques (e.g., Bluetooth low energy protocol, radio frequency signaling, NFC protocol).

In an embodiment, the first vehicle 105A may encrypt and transmit the masking and encryption keys using public and private keys to secure the transmission of the regenerated masking and encryption keys. For instance, encrypting with a public and private key may include a method of encrypting or signing data with two different keys (e.g., public and private). The public key may be available for a second system (e.g., vehicle computing system 200 of the first vehicle 105B) to use. For instance, the masking and encryp- tion keys encrypted with the public key may only be decrypted with the corresponding private key. The first vehicle 105A may encrypt the masking and encryption keys using a public key and transmit the encrypted keys to the second vehicle 105B over one or more networks.

In an embodiment, the method 900 may include an operation 910 in which the second vehicle 105B receives the encrypted key and decrypts the encrypted keys with a private key. For instance, the first vehicle 105A may sign and distribute the private key to the second vehicle 105B. Signing the private key may identify the second vehicle 105B as the recipient of the private key such that the private key may only be received and used by a signature (e.g., IP address, etc.) matching the second vehicle 105B.

The second vehicle 105B may receive the encrypted keys and decrypt the encrypted keys using the private key. In an embodiment, the decrypted masking keys and encryption keys may update the existing (e.g., cached) masking and encryption keys used by the random transformation genera- tor with the second vehicle 105B. For instance, the masking signature 915D of the first vehicle 105A may match the masking signature 915B of the second vehicle 105B.

While examples herein describe a first vehicle 105A and a second vehicle 105B, the present disclosure may be implemented across a plurality of vehicles 105 in which the second vehicle 105B may serve as the primary (e.g., first) vehicle.

Figure 10:
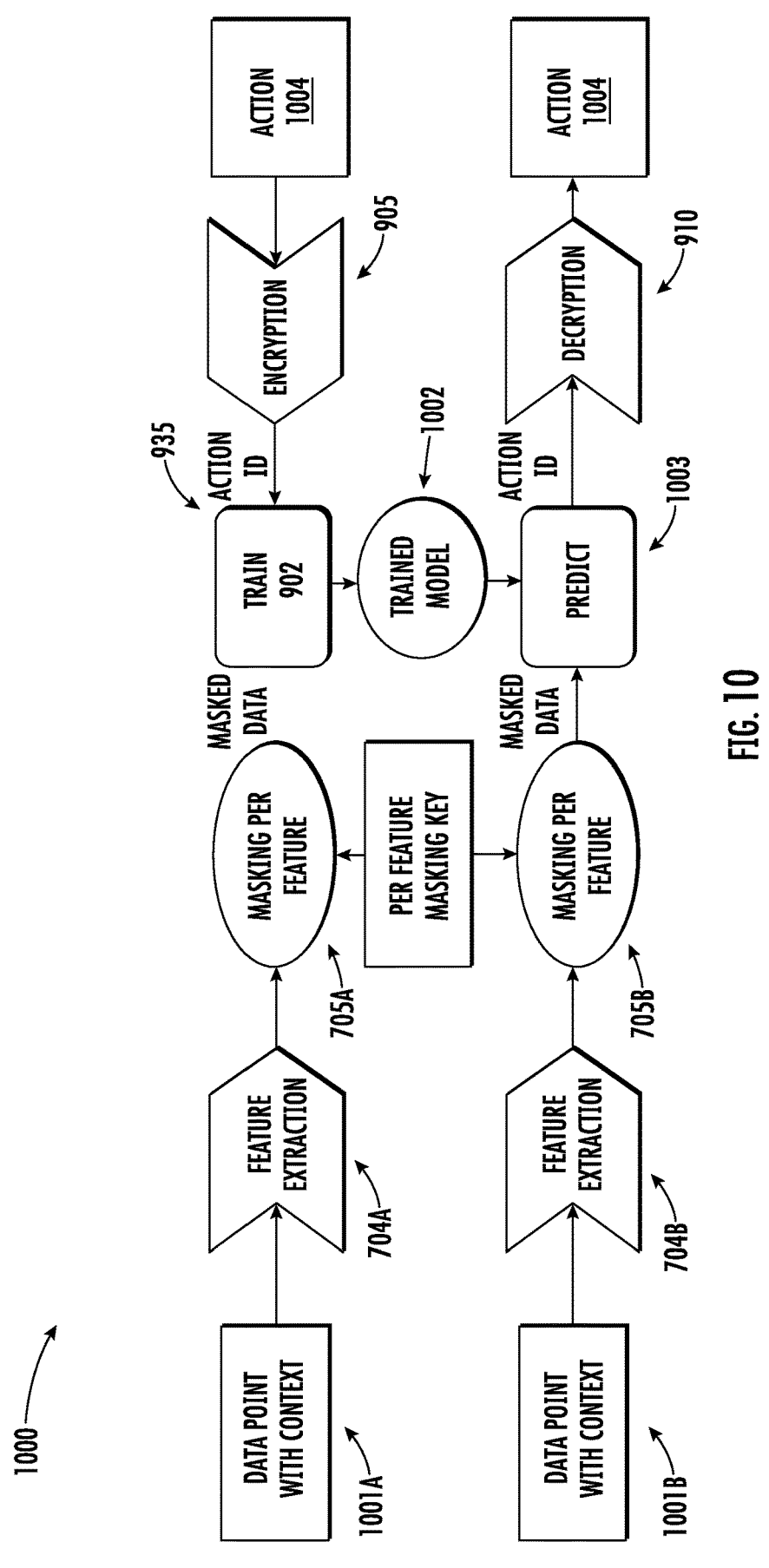
FIG. 10 illustrates an example flow diagram of an example training method according to an embodiment hereof.

FIG. 10 illustrates an example flow diagram of an example method of a remotely trained machine-learned model according to an embodiment hereof. The method 1000 may be performed by a computing system described with reference to the other figures. In an embodiment, the method 1000 may be performed by the control circuit of a vehicle computing system 200 of FIG. 1. One or more portions of the method 1000 may be implemented as an algorithm on the hardware components of the devices described herein. For example, the steps of method 1000 may be implemented as operations/instructions that are executable by computing hardware.

FIG. 10 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 10 is described with reference to elements/terms described with respect to other systems and figures, for example illustrated purposes and is not meant to be limiting. One or more portions of method 1000 may be performed additionally, or alternatively, by other systems. For example, method 1000 may be performed by a control circuit of the remote computing platform 110.

In an embodiment, the method 1000 may begin with or otherwise include an operation 1001A, in which the first vehicle 904A analyzes a plurality of original data points and identifies context associated with the data points. For instance, the plurality of original data points may be generated in Euclidian space. In some examples, a random transformation generator may convert the context into two-dimensional space.

The random transformation generator may extract features 704A indicative of the context associated with the plurality of original data points and generate masking keys for respective features. For instance, the random transformation generator may randomly select one or more transformations to apply to each extracted feature. The masking key for respective features 705A may include the set of randomly selected transformations. In some examples, the vehicle 105A may generate a masking signature 703A associated with the masking keys. For instance, the masking keys for respective features 705A may be compiled and hashed to generate the masking signature 703A. In some examples, the masking signature 703A may identify the masking keys for respective features 705A. In some examples, the vehicle 105A may encrypt action ids associated with the plurality of original data points. For instance, the action id may represent the action taken by the user 120 or the vehicle 105A which resulted in the datapoint. In some examples, the vehicle 105A may encrypt the action id using an encryption key.

The vehicle 105A may apply the masking keys to the extracted features and generate transformed data (e.g., masked data) including a plurality of masked data points. In an embodiment, the masked data may be used to train a machine-learned model in the cloud 902. For instance, the cloud 902 may be a remote computing system (e.g., remote computing platform 110) configured to remotely train a machine-learned model using masked data. In some examples, the vehicle 105A may transmit the masked data (e.g., transformed data) to the cloud 902 over one or more networks (e.g., network 130).

In some examples, the trained cloud model 1001 may be a fully trained machine-learned model or a partially trained machine-learned model. For instance, the cloud 902 (e.g., remote computing platform 110) may incrementally train the trained cloud model 1002. For instance, as the vehicle 105 generates data points, the vehicle 105 may generate a transformed data point and transmit the transformed data point to the cloud 902. The cloud may incrementally train the trained cloud model 1001 and transmit a partially trained cloud model 1001 to the vehicle 105.

In an embodiment, the cloud 902 may train machine-learned model using encrypted actions 1004. For instance, the masked data used to train the machine-learned model may be associated with the encrypted action ids generated by the vehicle 105A. The cloud 902 may produce a trained cloud model 1002 which predicts encrypted action ids rather than the original action (e.g., ground truth action). By way of example, the cloud 902 may receive masked data including transformed data points associated with an encrypted action id "Rnvw_128". The encrypted action id "Rnvw_128" may represent a ground truth action of unlocking a door when the user 120 is within a threshold distance from the vehicle 105A. The cloud 902 may receive a plurality of transformed data points associated with the encrypted action id "Rnvw_128" such that the trained cloud model 1002 is trained to predict the encrypted action id "Rnvw_128" rather than the ground truth action of unlocking a door.

In an embodiment, the vehicle 105A may share (e.g., transmit) the feature masking key and encryption key to the second vehicle 904B. For instance, vehicle 105A may transmit over one or more networks (e.g., network 130) feature masking keys and encryption keys to the second vehicle 105B such that the second vehicle 105B may utilize the cloud trained model 1002 and generate masked data (e.g., transformed data points) to further train the cloud trained model 1002. For instance, the cloud 902 may train a machine-learned model (e.g., trained cloud model 1002) using transformed vehicle data from the base vehicle 105A, second vehicle 105B or a combined data set from both vehicles 105A, 105B.

In an embodiment, the cloud 902 may transmit the trained cloud model 1001 to a vehicle 105B and replace the in-vehicle model running on the vehicle 105B. For instance, the cloud 902 (e.g., remote computing platform 110) may include vehicle software 405. The trained cloud model 1002 may be included as a software update 410 and update the vehicle software 405. In some examples, the cloud 902 (e.g., remote computing platform 110) may transmit updated vehicle software 405 to the vehicle 105B such that the machine-learned model running on the vehicle 105B (e.g., in-vehicle model) is replaced with the trained cloud model 1002.

In an embodiment, the method 1000 may continue or otherwise include an operation 1001B, in which the second vehicle 105B utilizes the cloud trained model 1002 to predict an action 1004. For instance, the second vehicle 105B may generate a plurality of original datapoints as the user 120 interacts with the second vehicle 105B. In an embodiment, the second vehicle 105B may include a random transformation generator. For instance, the second vehicle 105B may utilize the random transformation generator to analyze a plurality of original data points and identify context associated with the data points. For instance, the plurality of original data points may be generated in Euclidian space. In some examples, a random transformation generator may convert the context into two-dimensional space.

The random transformation generator may extract features 704B indicative of the context associated with the plurality of original data points and generate masking keys for respective features 705B. For instance, the random transformation generator may randomly select one or more transformations to apply to each extracted feature. The masking key for respective features 705B may include the set of randomly selected transformations. In some examples, second vehicle 105B may utilize the masking keys generated by the base vehicle 105A. For instance, the second vehicle 105B may receive the masking key and encryption keys over one or more networks (e.g., network 130).

The vehicle 105B may apply the masking keys generated by the base vehicle 105A to the extracted features and generate transformed data (e.g., masked data) including a plurality of masked data points. In an embodiment, the masked data may be used to as input to the trained cloud model 1002 running on the second vehicle 105B. For instance, the trained cloud model 1002 may be trained using masked data associated with the same masking signature 703A.

In an embodiment, the trained cloud model 1002 may also be used to predict encrypted actions ids that the second vehicle 105B may decrypt. By way of example, the second vehicle 105B may receive the masking and encryption keys from the base vehicle 105A and apply the masking key and encryption key to original datapoints generated on the second vehicle 105B. The second vehicle 105B may generate a masked input (e.g., transformed data points) and input the masked input into the cloud trained model 1002 running on the second vehicle 105B. The cloud trained model 1002 may predict to generate a masked output indicating an encrypted action. For instance, the cloud trained model 1002 may be trained to predict encrypted action ids rather than the original action (e.g., ground truth action). The second vehicle 105B may execute the operation 910 to decrypt the masked output (e.g., encrypted action ids) to determine the predicted action 1004. The predicted action 1004 may include one or more command instructions to control one or more vehicle functions 350A, 350B, 350 via one or more controllers 355A, 355B, 355C.

FIG. 11 illustrates a flowchart diagram of an example method 1100 according to an embodiment hereof. The method 1100 may be performed by a computing system described with reference to the other figures. In an embodiment, the method 1100 may be performed by the control circuit of a vehicle computing system 200 of FIG. 1. One or more portions of the method 1100 may be implemented as an algorithm on the hardware components of the devices described herein. For example, the steps of method 1100 may be implemented as operations/instructions that are executable by computing hardware.

FIG. 11 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 11 is described with reference to elements/terms described with respect to other systems and figures, for example illustrated purposes and is not meant to be limiting. One or more portions of method 1100 may be performed additionally, or alternatively, by other systems. For example, method 1100 may be performed by a control circuit of the remote computing platform 110.

In an embodiment, the method 1100 may begin with or otherwise include an operation 1102, obtaining vehicle operations data associated with a user and a vehicle. For instance, vehicle operations data (e.g., plurality of data points) may be generated as the user 120 interacts with the vehicle 105. The plurality of data points may be associated with one or more actions or predicted actions taken by the user 120 or executed by the vehicle. In an embodiment, a random transformation generator running within the vehicle computing system 200 may obtain vehicle operations data including a plurality for original datapoints.

The method 1100 in an embodiment may include an operation 1104, transforming the vehicle operations data based on one or more isometric transformations to obtain a masked input, the one or more isometric transformations associated with a feature masking key. For instance, the random transformation generator may generate a set of randomly selected transformations. The transformation may include a rotation (e.g., 602), reflection (e.g., 603), translation (e.g., 604), or any other transformation executable in two-dimensional space.

In an embodiment, the random transformation generator may convert context associated with the vehicle operations data (e.g., original data points) to two-dimensional space. For instance, the time of day (e.g., context) associated with a data point may be converted into two-dimensional space. In some examples, some features such as temperature (e.g., inside and outside) or location (e.g., latitude and longitude) may not need to be converted into two-dimensional space. Such features may already be defined in two-dimensions. The random transformation generator may apply the randomly selected transformations to each of the features associated with the vehicle operations data (e.g., plurality of data points) which requires conversion into two-dimensional space.

The feature masking keys (e.g., set of randomly selected transformations) may transform the vehicle operations data to generate a masked input. For instance, the random transformation generator may obscure (e.g., mask) personal or sensitive context associated with the vehicle operations data. For example, masking the context (e.g., respective features) associated with the vehicle operations data (e.g., plurality of data points) may represent actions taken in a different location, time, temperature, day of the week, etc., by performing one or more randomly selected isometric transformations. In some examples, the transformed vehicle operations data (e.g., masked input) may be used by a trained machine-learned model.

The method 1100 in an embodiment may include an operation 1106, inputting the masked input to a machine-learned model to obtain a masked output, wherein the machine-learned model was trained using previous masked inputs. For instance, the vehicle 105 may include one or more machine-learned models trained using transformed vehicle operations data (e.g., masked input). In some examples, trained machine-learned model may be remotely trained.

By way of example, the vehicle 105 may transmit transformed vehicle operations data (e.g., transformed data points), and encrypted action ids to a remote computing system (e.g., cloud 902). For instance, the transformed data points may be associated with an encrypted action id. The cloud 902 may be configured to train a machine-learned model using masked data points. The cloud 902 may receive the masked input and train the machine-learned model to produce a trained cloud model 1002. For instance, the trained cloud model 1002 may be trained to predict an encrypted action id. The cloud 902 may transmit the trained cloud model 1002 to the vehicle 105 and replace the machine-learned model running on the vehicle 105. The vehicle 105 may utilize the trained cloud model 1002 to predict actions within the vehicle 105.

The method 1100 in an embodiment may include an operation 1108, determining, based on an action masking key, an action associated with the masked output. For instance, the trained cloud model 1002 may be used in the vehicle 105 to predict a masked output because the cloud trained model 1002 was trained using masked inputs (e.g., masked datapoints based on the user 120 interacting with the vehicle 105). Once the masked output is generated by the trained cloud model 1002, the original action id associated with the masked output may be determined using the masking key (e.g., encryption keys, decryption keys, etc.). For instance, the vehicle computing system 200 may cache one or more decryption keys for decrypting the encrypted action id associated with the masked output. The vehicle computing system 200 may decrypt the encrypted action id to determine the original action (e.g., ground truth action) associated with the action id The method 1100 in an embodiment may include an operation 1110, controlling a component of the vehicle based on the action. For instance, the vehicle computing system 200 may decrypt the action id and determine a predicted action the vehicle 105 should take. For example, the trained cloud model 1002 may generate a masked output (e.g., encrypted action id) associated with one or more vehicle functions 350A-C. A vehicle function 350A-C may include one or more: (i) vehicle comfort functions; (ii) vehicle staging functions; (iii) vehicle climate functions; (vi) vehicle navigation functions; (v) drive style functions; (v) vehicle parking functions; or (vi) vehicle entertainment functions. For instance, one or more controllers 355A-C may include control circuitry configured to operate its associated vehicle function 355A-C.

FIG. 12 illustrates a flowchart diagram of an example method 1200 according to an embodiment hereof. The method 1200 may be performed by a computing system described with reference to the other figures. In an embodiment, the method 1200 may be performed by the control circuit of a remote computing platform 110 of FIG. 1. One or more portions of the method 1200 may be implemented as an algorithm on the hardware components of the devices described herein. For example, the steps of method 1200 may be implemented as operations/instructions that are executable by computing hardware.

FIG. 12 illustrates elements performed in a particular order for purposes of illustration and discussion. Those of ordinary skill in the art, using the disclosures provided herein, will understand that the elements of any of the methods discussed herein may be adapted, rearranged, expanded, omitted, combined, or modified in various ways without deviating from the scope of the present disclosure. FIG. 12 is described with reference to elements/terms described with respect to other systems and figures, for example illustrated purposes and is not meant to be limiting. One or more portions of method 1200 may be performed additionally, or alternatively, by other systems. For example, method 1200 may be performed by a control circuit of the third-party computing platform 125.

In an embodiment, the method 1200 may begin with or otherwise include an operation 1202, obtaining first transformed vehicle operations data associated with a user and a first vehicle, the first transformed vehicle operations data including a first masked input and a first masked output, the first transformed vehicle operations data associated with a first masking key. For instance, a first vehicle 904A may utilize a random transformation generator to generate masking keys to mask respective features associated with original data points (e.g., vehicle operations data). For example, the first vehicle 904A may generate a masked input by applying the feature masking keys to the vehicle operations data. In an embodiment, the random transformation generator may generate encryption keys and decryption keys for encrypting and decrypting action ids associated with the plurality of data points (e.g., vehicle operations data). The first vehicle 904A may generate a masking signature indicating the masking keys and encryption keys. For instance, the random transformation generator may hash the masking keys to generate a masking signature.

The first vehicle 105A may transmit the masked input (e.g., transformed vehicle operations data) to a cloud 902 where a machine-learned model may be trained. For instance, the cloud 902 may obtain a masked input and a masking signature (e.g., hashed masking keys) from the first vehicle 105A and remotely train a machine-learned model using the transformed vehicle operations data (e.g., masked input).

The method 1200 in an embodiment may include an operation 1204, obtaining second transformed vehicle operations data associated with a user and a second vehicle, the second transformed vehicle operations data including a second masked input and a second masked output, the first transformed vehicle operations data associated with a second masking key. For instance, a second vehicle 105B may utilize a random transformation generator to generate masking keys to mask respective features associated with original data points (e.g., vehicle operations data). For example, the second vehicle 105B may generate a masked input by applying the feature masking keys to the vehicle operations data. In an embodiment, the random transformation generator may generate encryption keys and decryption keys for encrypting and decrypting action ids associated with the plurality of data points (e.g., vehicle operations data). In some examples, the second vehicle 105B may utilize the same masking keys and encryption keys generated by the first vehicle 105A.

For instance, the first vehicle 105A may transmit over one or more networks (e.g., networks 130) the feature masking keys and encryption keys. For example, the first vehicle 105A and second vehicle 105B may generate the same masking signature. By way of example, the first vehicle 105A and second vehicle 105B may be configured to transmit feature masking keys and encryption keys to each other based on the same user 120 being authenticated with the vehicles (e.g., first vehicle, second vehicle 105B). For instance, each set of masking keys may generate a unique masking signature. The masking signature may be unique to the transformation or masking keys, such that each set of masking keys generate a unique masking signature. The masking signature may be associated with each user 120 or vehicle 105 such that any vehicle (e.g., first vehicle 105A, second vehicle 105B) may generate masked input (e.g., transformed vehicle operations data) using the same feature masking keys and encryption keys.

The second vehicle 105B may transmit the masked input (e.g., transformed vehicle operations data) to the cloud 902 where a machine-learned model may be trained. For instance, the cloud 902 may obtain a masked input and a masking signature (e.g., hashed masking keys) from the second vehicle 105B and remotely train a machine-learned model using the transformed vehicle operations data (e.g., masked input).

The method 1200 in an embodiment may include an operation 1206, determining a compatibility between the first masking key and the second masking key. For instance, the cloud 902, may determine the masked input received from the first vehicle 105A and the second vehicle 105B are associated with the same masking signature (e.g., masking keys, encryption keys, etc.). By comparing the received masking signatures each associated with a received masked input and seeing whether they match, it can be determined whether those transformed inputs were masked using the same keys.

The method 1200 in an embodiment may include an operation 1208, based on the determined compatibility, generating a masked training dataset including the first transformed vehicle operations data and the second transformed vehicle operations data. For instance, the cloud 902 may generate a combined data set from the first vehicle 105A and the second vehicle 105B based on determining the masking signature 915B associated with transformed vehicle operations data received from the first vehicle 105A and the masking signature 915D associated with transformed vehicle operations data received from the second vehicle 105B match. For instance, the cloud 902 may augment or supplement the transformed vehicle operations data received from the first vehicle 105A with transformed vehicle operations data received from the second vehicle 105B due to the masking signature indicating that the vehicle operations data from the first vehicle 105A and second vehicle 105B have been transformed using the same feature masking keys and encryption keys.

By way of example, the first vehicle 105A and the second vehicle 105B may generate transformed vehicle operations data using the same randomly generated transformations to obscure features (e.g., context) associated with actions represented by datapoints. The transformed vehicle operations data from the first vehicle 105A and the second vehicle 105B may maintain the same spatial relationship as original data-points generated by the respective vehicle (e.g., first vehicle 105A, second vehicle 105B). For instance, the cloud 902 may combine the transformed data set from the first vehicle 105A and the second vehicle 105B while maintaining the same spatial relationship as the original datapoints. In an embodiment, the combined transformed vehicle operations data set may obscure private or sensitive information. For instance, the original data points may be consistently transformed using the randomly generated feature masking keys. In some examples, the masking signature may identify the set of randomly generated transformations.

The method 1200 in an embodiment may include an operation 1210, training a machine-learned model using the masked training dataset to generate masked outputs based on masked inputs. For instance, the cloud may remotely train a machine-learned model using the combined data set from the first vehicle 105A and the second vehicle 105B to produce a trained cloud model 1002. The trained cloud model 1002 may be trained to receive masked input (e.g., transformed vehicle operations data using feature masking keys) and produce a masked output (e.g., encrypted action ids).

Training the trained cloud model 1002 may include using a model trainer that trains the trained cloud model 1002 stored at in the cloud 902 and/or the vehicles (e.g., first vehicle 105A, second vehicle 105B, vehicle 105, etc.) using various training or learning techniques. For example, the model (e.g., a trained cloud model 1002) may be trained using a loss function that evaluates quality of generated samples over various characteristics, such as similarity to the training data.

The cloud 902 may modify parameters of the trained cloud model 1002 based on the loss function (e.g., generative loss function) such that the trained cloud model 1002 may be effectively trained for specific applications in a supervised manner using labeled data and/or in an unsupervised manner.

The cloud 902 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

The method 1200 in an embodiment may include an operation 1212, transmitting the trained machine-learned model to at least one of the first vehicle 90A or the second vehicle 904B. For instance, the cloud 902 may transmit the trained cloud model 1002 to the base/first vehicle 105A or the second vehicle 105B. For instance, once the user 120 authenticates with the first vehicle 105A or second vehicle 105B, the cloud 902 may transmit the trained cloud model 1002 to the first vehicle 105A and/or second vehicle 105B. In some examples, the cloud 902 may transmit the trained cloud model to the first vehicle 105A and/or second vehicle 105B without the user 120 being authenticated. For instance, the first vehicle 105A may be associated with a single user profile associated with the user 120. In some examples, the single user profile may indicate that the user 120 is the only vehicle operator (e.g., user 120) associated with the first vehicle 105A. In an embodiment, the first vehicle 105A may periodically request OTA (over the air software) updates from the remote computing platform 110 including the latest trained cloud model. For instance, the first vehicle 105A may poll the remote computing platform 110 (e.g., cloud 902) to request the latest version of the cloud trained model.

Figure 13:
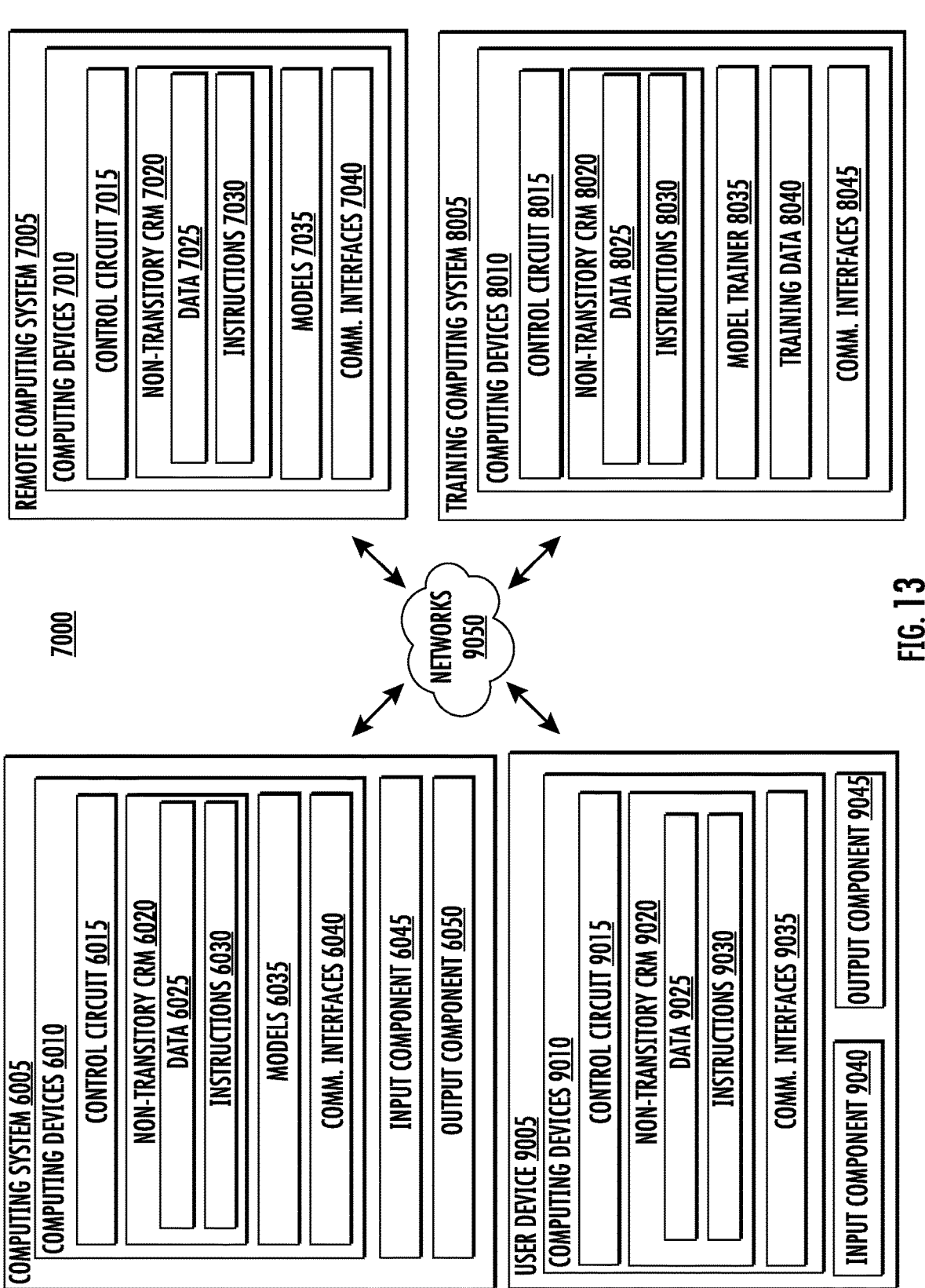
FIG. 13 illustrates a diagram of an example computing ecosystem with computing components according to an embodiment hereof.

FIG. 13 illustrates a block diagram of an example computing system 7000 according to an embodiment hereof. The system 7000 includes a computing system 6005, a remote computing system 7005, a user device 9005, and a training computing system 8005 that are communicatively coupled over one or more networks 9050.

The computing system 6005 may include one or more computing devices 6010 or circuitry. For instance, the computing system 6005 may include a control circuit 6015 and a non-transitory computer-readable medium 6020, also referred to herein as memory. In an embodiment, the control circuit 6015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In some implementations, the control circuit 6015 may be part of, or may form, a vehicle control unit (also referred to as a vehicle controller) that is embedded or otherwise disposed in a vehicle (e.g., a Mercedes-Benz® car or van). For example, the vehicle controller may be or may include an infotainment system controller (e.g., an infotainment head-unit), a telematics control unit (TCU), an electronic control unit (ECU), a central powertrain controller (CPC), a charging controller, a central exterior & interior controller (CEIC), a zone controller, or any other controller. In an embodiment, the control circuit 6015 may be programmed by one or more computer-readable or computer-executable instructions stored on the non-transitory computer-readable medium 6020.

In an embodiment, the non-transitory computer-readable medium 6020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium 6020 may form, e.g., a hard disk drive (HDD), a solid state drive (SDD) or solid state integrated memory, a random access memory (RAM), a read-only memory (ROM), an erasable program-mable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 6020 may store information that may be accessed by the control circuit 6015. For instance, the non-transitory computer-readable medium 6020 (e.g., memory devices) may store data 6025 that may be obtained, received, accessed, written, manipu-lated, created, and/or stored. The data 6025 may include, for instance, any of the data or information described herein. In some implementations, the computing system 6005 may obtain data from one or more memories that are remote from the computing system 6005.

The non-transitory computer-readable medium 6020 may also store computer-readable instructions 6030 that may be executed by the control circuit 6015. The instructions 6030 may be software written in any suitable programming lan-guage or may be implemented in hardware. The instructions may include computer-readable instructions, computer-ex-ecutable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a col-lection of software instructions or code configured to cause the control circuit 6015 to perform one or more functional tasks. The modules and computer-readable/executable instructions may be described as performing various opera-tions or tasks when the control circuit 6015 or other hard-ware component is executing the modules or computer-readable instructions.

The instructions 6030 may be executed in logically and/or virtually separate threads on the control circuit 6015. For example, the non-transitory computer-readable medium 6020 may store instructions 6030 that when executed by the control circuit 6015 cause the control circuit 6015 to per-form any of the operations, methods and/or processes described herein. In some cases, the non-transitory com-puter-readable medium 6020 may store computer-execut-able instructions or computer-readable instructions, such as instructions to perform at least a portion of the methods of FIGS. 6-12.

In an embodiment, the computing system 6005 may store or include one or more machine-learned models 6035. For example, the machine-learned models 6035 may be or may otherwise include various machine-learned models, includ-ing machine-learned generative models (e.g., trained cloud model 1002). In an embodiment, the machine-learned mod-els 6035 may include neural networks (e.g., deep neural networks) or other types of machine-learned models, includ-ing non-linear models and/or linear models. Neural net-works may include feed-forward neural networks, recurrent neural networks (e.g., long short-term memory recurrent neural networks), convolutional neural networks or other forms of neural networks. Some example machine-learned models may leverage an attention mechanism such as self-attention. For example, some example machine-learned models may include multi-headed self-attention models (e.g., transformer models). As another example, the machine-learned models 6035 can include generative mod-els, such as stable diffusion models, generative adversarial networks (GAN), GPT models, and other suitable models.

In an aspect of the present disclosure, the models 6035 may be used to determine an encrypted action id (e.g., masked output). For example, the machine-learned models 6035 can, in response to masked input including a plurality of transformed data points, the models 6035 may be trained to predict an action (e.g., encrypted action id). The models 6035 may determine based on a plurality of transformed datapoints with similar transformed context, a predicted encrypted action id.

In an embodiment, the one or more machine-learned models 6035 may be received from the remote computing system 7005 over networks 9050, stored in the computing system 6005 (e.g., non-transitory computer-readable medium 6020), and then used or otherwise implemented by the control circuit 6015. In an embodiment, the computing system 6005 may implement multiple parallel instances of a single model.

Additionally, or alternatively, one or more machine-learned models 6035 may be included in or otherwise stored and implemented by the remote computing system 7005 that communicates with the computing system 6005 according to a client-server relationship. For example, the machine-learned models 6035 may be implemented by the remote computing system 7005 as a portion of a web service. Thus, one or more models 6035 may be stored and/or implemented (e.g., as models 7035) at the computing system 6005 and/or one or more models 6035 may be stored and implemented at the remote computing system 7005.

The computing system 6005 may include one or more communication interfaces 6040. The communication inter-faces 6040 may be used to communicate with one or more other systems. The communication interfaces 6040 may include any circuits, components, software, etc. for commu-nicating via one or more networks (e.g., networks 9050). In some implementations, the communication interfaces 6040 may include for example, one or more of a communications controller, receiver, transceiver, transmitter, port, conduc-tors, software and/or hardware for communicating data/ information.

The computing system 6005 may also include one or more user input components 6045 that receives user input. For example, the user input component 6045 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a micro-phone, a traditional keyboard, cursor-device, joystick, or other devices by which a user may provide user input.

The computing system 6005 may include one or more output components 6050. The output components 6050 may include hardware and/or software for audibly or visually producing content. For instance, the output components 6050 may include one or more speakers, earpieces, headsets, handsets, etc. The output components 6050 may include a display device, which may include hardware for displaying a user interface and/or messages for a user. By way of example, the output component 6050 may include a display screen, CRT, LCD, plasma screen, touch screen, TV, pro-jector, tablet, and/or other suitable display components.

The remote computing system 7005 may include one or more computing devices 7010. In an embodiment, the remote computing system 7005 may include or is otherwise implemented by one or more computing devices onboard an autonomous drone. In instances in which the remote computing system 7005 includes computing devices onboard an autonomous drone, such drone computing devices may operate according to sequential computing architectures, parallel computing architectures, or some combination thereof.

The remote computing system 7005 may include a control circuit 7015 and a non-transitory computer-readable medium 7020, also referred to herein as memory 7020. In an embodiment, the control circuit 7015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 7015 may be programmed by one or more computer-readable or computer-executable instructions stored on the non-transitory computer-readable medium 7020.

In an embodiment, the non-transitory computer-readable medium 7020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 7020 may store information that may be accessed by the control circuit 7015. For instance, the non-transitory computer-readable medium 7020 (e.g., memory devices) may store data 7025 that may be obtained, received, accessed, written, manipulated, created, and/or stored. The data 7025 may include, for instance, any of the data or information described herein. In some implementations, the server system 7005 may obtain data from one or more memories that are remote from the server system 7005.

The non-transitory computer-readable medium 7020 may also store computer-readable instructions 7030 that may be executed by the control circuit 7015. The instructions 7030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 7015 to perform one or more functional tasks. The modules and computer-readable/executable instructions may be described as performing various operations or tasks when the control circuit 7015 or other hardware component is executing the modules or computer-readable instructions.

The instructions 7030 may be executed in logically and/or virtually separate threads on the control circuit 7015. For example, the non-transitory computer-readable medium

7020 may store instructions 7030 that when executed by the control circuit 7015 cause the control circuit 7015 to perform any of the operations, methods and/or processes described herein. In some cases, the non-transitory computer-readable medium 7020 may store computer-executable instructions or computer-readable instructions, such as instructions to perform at least a portion of the method of FIGS. 6-12.

The remote computing system 7005 may include one or more communication interfaces 7035. The communication interfaces 7040 may be used to communicate with one or more other systems. The communication interfaces 7040 may include any circuits, components, software, etc. for communicating via one or more networks (e.g., networks 9050). In some implementations, the communication interfaces 7040 may include for example, one or more of a communications controller, receiver, transceiver, transmitter, port, conductors, software and/or hardware for communicating data/information.

The computing system 6005 and/or the remote computing system 7005 may train the models 6035, 7035 via interaction with the training computing system 8005 that is communicatively coupled over the networks 9050. The training computing system 8005 may be separate from the remote computing system 7005 or may be a portion of the remote computing system 7005.

The training computing system 8005 may include one or more computing devices 8010. In an embodiment, the training computing system 8005 may include or is otherwise implemented by one or more server computing devices. In instances in which the training computing system 8005 includes plural server computing devices, such server computing devices may operate according to sequential computing architectures, parallel computing architectures, or some combination thereof.

The training computing system 8005 may include a control circuit 8015 and a non-transitory computer-readable medium 8020, also referred to herein as memory 8020. In an embodiment, the control circuit 8015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 8015 may be programmed by one or more computer-readable or computer-executable instructions stored on the non-transitory computer-readable medium 8020.

In an embodiment, the non-transitory computer-readable medium 8020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 8020 may store information that may be accessed by the control circuit 8015. For instance, the non-transitory computer-readable medium 8020 (e.g., memory devices) may store data 8025 that may be obtained, received, accessed, written, manipulated, created, and/or stored. The data 8025 may include, for instance, any of the data or information described herein. In some implementations, the training computing system 8005 may obtain data from one or more memories that are remote from the training computing system 8005.

The non-transitory computer-readable medium 8020 may also store computer-readable instructions 8030 that may be executed by the control circuit 8015. The instructions 8030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 8015 to perform one or more functional tasks. The modules and computer-readable/executable instructions may be described as performing various operations or tasks when the control circuit 8015 or other hardware component is executing the modules or computer-readable instructions.

The instructions 8030 may be executed in logically or virtually separate threads on the control circuit 8015. For example, the non-transitory computer-readable medium 8020 may store instructions 8030 that when executed by the control circuit 8015 cause the control circuit 8015 to perform any of the operations, methods and/or processes described herein. In some cases, the non-transitory computer-readable medium 8020 may store computer-executable instructions or computer-readable instructions, such as instructions to perform at least a portion of the methods of FIGS. 6-12.

The training computing system 8005 may include a model trainer 8035 that trains the machine-learned models 6035, 7035 stored at the computing system 6005 and/or the remote computing system 7005 using various training or learning techniques. For example, the models 6035, 7035 (e.g., a trained cloud model 1002) may be trained using a loss function that evaluates quality of generated samples over various characteristics, such as similarity to the training data.

The training computing system 8005 may modify parameters of the models 6035, 7035 (e.g., the trained cloud model 1002) based on the loss function (e.g., generative loss function) such that the models 6035, 7035 may be effectively trained for specific applications in a supervised manner using labeled data and/or in an unsupervised manner.

In an example, the model trainer 8035 may backpropagate the loss function through the models 6035, 7035 (e.g., the trained cloud model 1002) to modify the parameters (e.g., weights) of the models 6035, 7035. The model trainer 8035 may continue to backpropagate the loss function through the machine-learned model, with or without modification of the parameters (e.g., weights) of the model. For instance, the model trainer 8035 may perform a gradient descent technique in which parameters of the machine-learned model may be modified in the direction of a negative gradient of the loss function. Thus, in an embodiment, the model trainer 8035 may modify parameters of the machine-learned model based on the loss function.

The model trainer 8035 may utilize training techniques, such as backwards propagation of errors. For example, a loss function may be backpropagated through a model to update one or more parameters of the models (e.g., based on a gradient of the loss function). Various loss functions may be used such as mean squared error, likelihood loss, cross entropy loss, hinge loss, and/or various other loss functions. Gradient descent techniques may be used to iteratively update the parameters over a number of training iterations.

In an embodiment, performing backwards propagation of errors may include performing truncated backpropagation through time. The model trainer 8035 may perform a number of generalization techniques (e.g., weight decays, dropouts, etc.) to improve the generalization capability of a model being trained. In particular, the model trainer 8035 may train the machine-learned models 6035, 7035 based on a set of training data 8040.

The training data 8040 may include unlabeled training data for training in an unsupervised fashion. Furthermore, in some implementations, the training data 8040 can include labeled training data for training in a supervised fashion. For example, the training data 8040 can be or can include the training data such as the dataset of transformed data points (e.g., operation 707) of FIG. 7.

In an embodiment, if the user has provided consent/authorization, training examples may be provided by the computing system 6005 (e.g., of the user's vehicle). Thus, in such implementations, a model 6035 provided to the computing system 6005 may be trained by the training computing system 8005 in a manner to personalize the model 6035.

The model trainer 8035 may include computer logic utilized to provide desired functionality. The model trainer 8035 may be implemented in hardware, firmware, and/or software controlling a general-purpose processor. For example, in an embodiment, the model trainer 8035 may include program files stored on a storage device, loaded into a memory and executed by one or more processors. In other implementations, the model trainer 8035 may include one or more sets of computer-executable instructions that are stored in a tangible computer-readable storage medium such as RAM, hard disk, or optical or magnetic media.

The training computing system 8005 may include one or more communication interfaces 8045. The communication interfaces 8045 may be used to communicate with one or more other systems. The communication interfaces 8045 may include any circuits, components, software, etc. for communicating via one or more networks (e.g., networks 9050). In some implementations, the communication interfaces 8045 may include for example, one or more of a communications controller, receiver, transceiver, transmitter, port, conductors, software and/or hardware for communicating data/information.

The computing system 6005, the remote computing system 7005, and/or the training computing system 8005 may also be in communication with a user device 9005 that is communicatively coupled over the networks 9050.

The user device 9005 may include various types of user devices. This may include wearable devices (e.g., glasses, watches, etc.), handheld devices, tablets, or other types of devices.

The user device 9005 may include one or more computing devices 9010. The user device 9005 may include a control circuit 9015 and a non-transitory computer-readable medium 9020, also referred to herein as memory 9020. In an embodiment, the control circuit 9015 may include one or more processors (e.g., microprocessors), one or more processing cores, a programmable logic circuit (PLC) or a programmable logic/gate array (PLA/PGA), a field programmable gate array (FPGA), an application specific integrated circuit (ASIC), or any other control circuit. In an embodiment, the control circuit 9015 may be programmed by one or more computer-readable or computer-executable instructions stored on the non-transitory computer-readable medium 9020.

In an embodiment, the non-transitory computer-readable medium 9020 may be a memory device, also referred to as a data storage device, which may include an electronic storage device, a magnetic storage device, an optical storage device, an electromagnetic storage device, a semiconductor storage device, or any suitable combination thereof. The non-transitory computer-readable medium may form, e.g., a hard disk drive (HDD), a solid state drive (SDD) or solid state integrated memory, a random access memory (RAM), a read-only memory (ROM), an erasable programmable read-only memory (EPROM or Flash memory), a static random access memory (SRAM), dynamic random access memory (DRAM), a portable compact disc read-only memory (CD-ROM), a digital versatile disk (DVD), and/or a memory stick.

The non-transitory computer-readable medium 9020 may store information that may be accessed by the control circuit 9015. For instance, the non-transitory computer-readable medium 9020 (e.g., memory devices) may store data 9025 that may be obtained, received, accessed, written, manipulated, created, and/or stored. The data 9025 may include, for instance, any of the data or information described herein. In some implementations, the user device 9005 may obtain data from one or more memories that are remote from the user device 9005.

The non-transitory computer-readable medium 9020 may also store computer-readable instructions 9030 that may be executed by the control circuit 9015. The instructions 9030 may be software written in any suitable programming language or may be implemented in hardware. The instructions may include computer-readable instructions, computer-executable instructions, etc. As described herein, in various embodiments, the terms "computer-readable instructions" and "computer-executable instructions" are used to describe software instructions or computer code configured to carry out various tasks and operations. In various embodiments, if the computer-readable or computer-executable instructions form modules, the term "module" refers broadly to a collection of software instructions or code configured to cause the control circuit 9015 to perform one or more functional tasks. The modules and computer-readable/executable instructions may be described as performing various operations or tasks when the control circuit 9015 or other hardware component is executing the modules or computer-readable instructions.

The instructions 9030 may be executed in logically or virtually separate threads on the control circuit 9015. For example, the non-transitory computer-readable medium 9020 may store instructions 9030 that when executed by the control circuit 9015 cause the control circuit 9015 to perform any of the operations, methods and/or processes described herein. In some cases, the non-transitory computer-readable medium 9020 may store computer-executable instructions or computer-readable instructions, such as instructions to perform at least a portion of the methods of FIGS. 6-12.

The user device 9005 may include one or more communication interfaces 9035. The communication interfaces 9035 may be used to communicate with one or more other systems. The communication interfaces 9035 may include any circuits, components, software, etc. for communicating via one or more networks (e.g., networks 7050). In some implementations, the communication interfaces 9035 may include for example, one or more of a communications controller, receiver, transceiver, transmitter, port, conductors, software and/or hardware for communicating data/information.

The user device 9005 may also include one or more user input components 9040 that receives user input. For example, the user input component 9040 may be a touch-sensitive component (e.g., a touch-sensitive display screen or a touch pad) that is sensitive to the touch of a user input object (e.g., a finger or a stylus). The touch-sensitive component may serve to implement a virtual keyboard. Other example user input components include a microphone, a traditional keyboard, cursor-device, joystick, or other devices by which a user may provide user input.

The user device 9005 may include one or more output components 9045. The output components 9045 may include hardware and/or software for audibly or visually producing content. For instance, the output components 9045 may include one or more speakers, earpieces, headsets, handsets, etc. The output components 9045 may include a display device, which may include hardware for displaying a user interface and/or messages for a user. By way of example, the output component 9045 may include a display screen, CRT, LCD, plasma screen, touch screen, TV, projector, tablet, and/or other suitable display components. As described herein, the output components 9045 may include a form factor such as lens of glasses. This can be used for an AR interface displayed via the user device 9005, while it is worn by a user.

The one or more networks 9050 may be any type of communications network, such as a local area network (e.g., intranet), wide area network (e.g., Internet), or some combination thereof and may include any number of wired or wireless links. In general, communication over a network 9050 may be carried via any type of wired and/or wireless connection, using a wide variety of communication protocols (e.g., TCP/IP. HTTP, SMTP, FTP), encodings or formats (e.g., HTML, XML), and/or protection schemes (e.g., VPN, secure HTTP, SSL).

ADDITIONAL DISCUSSION OF VARIOUS EMBODIMENTS

Embodiment 1 relates to a computing system of a vehicle. The computing system may include a control circuit. The control circuit may be configured to obtain vehicle operations data associated with a user and a vehicle. The control circuit may be configured to transform the vehicle operations data based on one or more isometric transformations to obtain a masked input, the one or more isometric transformations associated with a feature masking key. The control circuit may be configured to input the masked input to a machine-learned model to obtain a masked output, wherein the machine-learned model was trained using previous masked inputs. The control circuit may be configured to determine, based on an action masking key, an action associated with the masked output. The control circuit may be configured to control a component of the vehicle based on the action.

Embodiment 2 includes the computing system of embodiment 1. In this embodiment, the vehicle operations data includes a plurality of data points, the plurality of data points associated with a spatial relationship.

Embodiment 3 includes the computing system of embodiment 2. In this embodiment, the control circuit is configured to extract a plurality of features, the plurality of features indicative of contextual information associated with the plurality of data points.

Embodiment 4 includes the computing system of embodiment 3. In this embodiment, the contextual information is indicative of at least one of: (i) a time, (ii) a location, or (iii) a day of week.

Embodiment 5 includes the computing system of any of embodiments 1 to 4. In this embodiment, the control circuit is configured to generate the one or more isometric transformations and the feature masking key associated with the one or more isometric transformations.

Embodiment 6 includes the computing system of embodiment 5. In this embodiment generating the one or more isometric transformation includes determining one or more transformation parameters using a random number generator, wherein the one or more transformation parameters includes at least one of: (i) a translation parameter, (ii) a rotation parameter, or (iii) a reflection parameter.

Embodiment 7 includes the computing system of any of embodiments 1 to 6. In this embodiment, the machine-learned model was trained by a remote computing system based on a training dataset including the previous masked inputs associated with the vehicle and previous masked ground truth outputs associated with the user.

Embodiment 8 includes the computing system of any of embodiments 1 to 7. In this embodiment, the control circuit is configured to generate a masking signature associated with the masking key and the action key. In this embodiment, the control circuit is configured to transmit the masking signature, masked input, and a masked ground truth output to a remote computing system.

Embodiment 9 includes the computing system of any of embodiments 1 to 8. In this embodiment, the machine-learned model was trained by a remote computing system based on a training dataset including previous masked inputs associated with a second vehicle and previous masked ground truth outputs associated with the user.

Embodiment 10 includes the computing system of any of embodiments 1 to 9. In this embodiment, the control circuit is configured to train the machine-learned model based on the masked output and a masked ground truth action.

Embodiment 11 includes the computing system of any of embodiments 1 to 10. In this embodiment, the action is indicative of at least one of: (i) a predicted action of the user or (ii) a predicted action of the vehicle.

Embodiment 12 includes the computing system of any of embodiments 1 to 11. In this embodiment, the control circuit is configured to obtain a masking signature associated with the user. In this embodiment, the control circuit is configured to compare the masking signature with a cached masking signature. In this embodiment, the control circuit is configured to validate the feature masking key and the action masking key.

Embodiment 13 includes the computing system of any of embodiments 1 to 12. In this embodiment, the control circuit is configured to obtain a masking signature associated with the user. In this embodiment, the control circuit is configured to determine an incompatibility of the masking signature with a cached masking signature associated with a second user. In this embodiment, the control circuit is configured to generate an updated masking signature associated with an updated masking key and an updated action key. In this embodiment, the control circuit is configured to transmit updated masked input an updated masked ground truth output to the remote computing system. In this embodiment, the control circuit is configured to determine a compatibility of the updated masking signature with the cache masking signature associated with the second user.

Embodiment 14 relates to a computer-implemented method. The method can include obtaining vehicle operations data associated with a user and a vehicle. The method can include transforming the vehicle operations data based on one or more isometric transformations to obtain a masked input, the one or more isometric transformations associated with a feature masking key. The method can include inputting the masked input to a machine-learned model to obtain a masked output, wherein the machine-learned model was trained using previous masked inputs. The method can include determining, based on an action masking key, an action associated with the masked output. The method can include controlling a component of the vehicle based on the action.

Embodiment 15 includes the method of embodiment 14. In this embodiment, the vehicle operations data includes a plurality of data points, the plurality of data points associated with a spatial relationship.

Embodiment 16 includes the method of embodiment 15. In this embodiment, the method can include extracting a plurality of features, the plurality of features indicative of contextual information associated with the plurality of data points.

Embodiment 17 includes the method of embodiment 16. In this embodiment, the contextual information is indicative of at least one of (i) a time, (ii) a location, or (iii) a day of week.

Embodiment 18 includes the method of embodiment 14 to 17. In this embodiment, the method can include generating the one or more isometric transformations and the feature masking key associated with the one or more isometric transformations.

Embodiment 19 includes the method of embodiment 18. In this embodiment, generating the one or more isometric transformation includes determining one or more transformation parameters using a random number generator, wherein the one or more transformation parameters include at least one of: (i) a translation parameter, (ii) a rotation parameter, or (iii) a reflection parameter.

Embodiment 20 is directed to one or more non-transitory computer-readable media. The one or more non-transitory computer readable media can store instructions that are executable by a control circuit. The control circuit executing the instructions can obtain first transformed vehicle operations data associated with a user and a first vehicle, the first transformed vehicle operations data including a first masked input and a first masked output, the first transformed vehicle operations data associated with a first masking key. The control circuit executing the instructions can obtain second transformed vehicle operations data associated with a user and a second vehicle, the second transformed vehicle operations data including a second masked input and a second masked output, the first transformed vehicle operations data associated with a second masking key. The control circuit executing the instructions can determine a compatibility between the first masking key and the second masking key. The control circuit executing the instructions can, based on the determined compatibility, generate a masked training dataset comprising the first transformed vehicle operations data and the second transformed vehicle operations data. The control circuit executing the instructions can train a machine-learned model using the masked training dataset to generate masked outputs based on masked inputs. The control circuit executing the instructions can transmit the trained machine-learned model to at least one of the first vehicle or the second vehicle.

Additional Disclosure

As used herein, adjectives and their possessive forms are intended to be used interchangeably unless apparent otherwise from the context and/or expressly indicated. For instance, "component of a/the vehicle" may be used interchangeably with "vehicle component" where appropriate. Similarly, words, phrases, and other disclosure herein is intended to cover obvious variants and synonyms even if such variants and synonyms are not explicitly listed.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein may be implemented using a single device or component or multiple devices or components working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment may be used with another embodiment to yield a still further embodiment. Thus, it is intended that the present disclosure cover such alterations, variations, and equivalents.

Aspects of the disclosure have been described in terms of illustrative implementations thereof. Numerous other implementations, modifications, or variations within the scope and spirit of the appended claims may occur to persons of ordinary skill in the art from a review of this disclosure. Any and all features in the following claims may be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. The term "or" and "and/or" may be used interchangeably herein. Lists joined by a particular conjunction such as "or," for example, may refer to "at least one of" or "any combination of" example elements listed therein, with "or" being understood as "and/or" unless otherwise indicated. Also, terms such as "based on" should be understood as "based at least in part on."

Those of ordinary skill in the art, using the disclosures provided herein, will understand that the elements of any of the claims, operations, or processes discussed herein may be adapted, rearranged, expanded, omitted, combined, or modified in various ways without deviating from the scope of the present disclosure. At times, elements may be listed in the specification or claims using a letter reference for exemplary illustrated purposes and is not meant to be limiting. Letter references, if used, do not imply a particular order of operations or a particular importance of the listed elements. For instance, letter identifiers such as (a), (b), (c), . . . , (i), (ii), (iii), . . . , etc. may be used to illustrate operations or different elements in a list. Such identifiers are provided for the ease of the reader and do not denote a particular order, importance, or priority of steps, operations, or elements. For instance, an operation illustrated by a list identifier of (a), (i), etc. may be performed before, after, or in parallel with another operation illustrated by a list identifier of (b), (ii), etc.

What is claimed is:

1. A computing system comprising:
a control circuit configured to:
obtain vehicle operations data associated with a user and a vehicle;
transform the vehicle operations data based on one or more isometric transformations to obtain a masked input wherein:
the masked input preserves privacy of the vehicle operations data, and
the one or more isometric transformations are associated with a feature masking key;
input the masked input to a machine-learned model to obtain a masked output, wherein the machine-learned model was trained using previous masked inputs;
determine, based on an action masking key, an action associated with the masked output; and
control, using a vehicle controller, a vehicle function of the vehicle based on the action, wherein the vehicle controller comprises circuitry configured to operate or adjust a setting of the vehicle function.

2. The computing system of claim 1, wherein the vehicle operations data comprises a plurality of data points, the plurality of data points associated with a spatial relationship.

3. The computing system of claim 2, wherein the control circuit is configured to extract a plurality of features, the plurality of features indicative of contextual information associated with the plurality of data points.

4. The computing system of claim 3, wherein the contextual information is indicative of at least one of: (i) a time, (ii) a location, or (iii) a day of week.

5. The computing system of claim 1, wherein the control circuit is configured to generate the one or more isometric transformations and the feature masking key associated with the one or more isometric transformations.

6. The computing system of claim 5, wherein generating the one or more isometric transformations comprises determining one or more transformation parameters using a random number generator, wherein the one or more transformation parameters comprise at least one of: (i) a translation parameter, (ii) a rotation parameter, or (iii) a reflection parameter.

7. The computing system of claim 1, wherein the machine-learned model was trained by a remote computing system based on a training dataset comprising the previous masked inputs associated with the vehicle and previous masked ground truth outputs associated with the user.

8. The computing system of claim 1, wherein the control circuit is configured to:
generate a masking signature associated with the feature masking key and the action masking key; and transmit the masking signature, masked input, and a masked ground truth output to a remote computing system.

9. The computing system of claim 1, wherein the machine-learned model was trained by a remote computing system based on a training dataset comprising previous masked inputs associated with a second vehicle and previous masked ground truth outputs associated with the user.

10. The computing system of claim 1, wherein the control circuit is configured to train the machine-learned model based on the masked output and a masked ground truth action.

11. The computing system of claim 1, wherein the action is indicative of at least one of: (i) a predicted action of the user or (ii) a predicted action of the vehicle.

12. The computing system of claim 1, wherein the control circuit is configured to:
obtain a masking signature associated with the user;
compare the masking signature with a cached masking signature; and
validate the feature masking key and the action masking key.

13. The computing system of claim 1, wherein the control circuit is configured to:
obtain a masking signature associated with the user;
determine an incompatibility of the masking signature with a cached masking signature associated with a second user;
generate an updated masking signature associated with an updated masking key and an updated action key;
transmit updated masked input an updated masked ground truth output to a remote computing system; and
determine a compatibility of the updated masking signature with the cache masking signature associated with the second user.

14. A computer-implemented method comprising:
obtaining vehicle operations data associated with a user and a vehicle;
transforming the vehicle operations data based on one or more isometric transformations to obtain a masked input wherein:
the masked input preserves privacy of the vehicle operations data, and
the one or more isometric transformations are associated with a feature masking key;
inputting the masked input to a machine-learned model to obtain a masked output, wherein the machine-learned model was trained using previous masked inputs;
determining, based on an action masking key, an action associated with the masked output; and
controlling, using a vehicle controller, a vehicle function of the vehicle based on the action, wherein the vehicle controller comprises circuitry configured to operate or adjust a setting of the vehicle function.

15. The computer-implemented method of claim 14, wherein the vehicle operations data comprises a plurality of data points, the plurality of data points associated with a spatial relationship.

16. The computer-implemented method of claim 15, further comprising:
extracting a plurality of features, the plurality of features indicative of contextual information associated with the plurality of data points.

17. The computer-implemented method of claim 16, wherein the contextual information is indicative of at least one of (i) a time, (ii) a location, or (iii) a day of week.

18. The computer-implemented method of claim 14, further comprising generating the one or more isometric transformations and the feature masking key associated with the one or more isometric transformations.

19. The computer-implemented method of claim 18, wherein generating the one or more isometric transformations comprises determining one or more transformation parameters using a random number generator, wherein the one or more transformation parameters comprise at least one of: (i) a translation parameter, (ii) a rotation parameter, or (iii) a reflection parameter.

20. A computing system comprising:
a control circuit configured to:
obtain first transformed vehicle operations data associated with a user and a first vehicle, the first transformed vehicle operations data comprising a first masked input and a first masked output, the first transformed vehicle operations data associated with a first masking key;
obtain second transformed vehicle operations data associated with a user and a second vehicle, the second transformed vehicle operations data comprising a second masked input and a second masked output, the first transformed vehicle operations data associated with a second masking key;
determine a compatibility between the first masking key and the second masking key;
based on the determined compatibility, generate a masked training dataset comprising the first transformed vehicle operations data and the second transformed vehicle operations data, wherein the masked training dataset preserves a privacy of the first transformed vehicle operations data and the second transformed vehicle operations data:
train a machine-learned model using the masked training dataset to generate masked outputs based on masked inputs; and
transmit the trained machine-learned model to at least one of the first vehicle or the second vehicle, wherein the trained machine-learned model is configured to output an action to control, using a vehicle controller, a vehicle function of at least one of the first vehicle or the second vehicle, wherein the vehicle controller comprises circuitry configured to operate or adjust a setting of the vehicle function.

* * * * *